US012621237B2

(12) United States Patent
Kalita et al.

(10) Patent No.: US 12,621,237 B2
(45) Date of Patent: May 5, 2026

(54) FAST AND RELIABLE INTER-NETWORK ELEMENT OPTICAL PROTECTION SWITCHING

(71) Applicant: Infinera Corp., San Jose, CA (US)

(72) Inventors: Dharmendra Kalita, San Jose, CA (US); Kapil Juneja, Karnataka (IN); Ashok Kunjidhapatham, Devarachikkanahalli (IN); Pardeep Kumar Reddy Buyanni, San Jose, CA (US)

(73) Assignee: Infinera Corp.

( * ) Notice: Subject to any disclaimer, the term of this patent is extended or adjusted under 35 U.S.C. 154(b) by 261 days.

(21) Appl. No.: 18/461,283

(22) Filed: Sep. 5, 2023

(65) Prior Publication Data

US 2024/0080261 A1      Mar. 7, 2024

Related U.S. Application Data

(60) Provisional application No. 63/403,639, filed on Sep. 2, 2022.

(51) Int. Cl.
*H04L 45/28* (2022.01)
*H04L 45/00* (2022.01)
*H04L 45/24* (2022.01)

(52) U.S. Cl.
CPC .............. *H04L 45/28* (2013.01); *H04L 45/24* (2013.01); *H04L 45/62* (2013.01)

(58) Field of Classification Search
CPC ......... H04L 45/28; H04L 45/24; H04L 45/62; H04L 45/22
See application file for complete search history.

(56) References Cited

U.S. PATENT DOCUMENTS

| | | | |
|---|---|---|---|
| 2010/0183298 A1* | 7/2010 | Biegert | H04Q 11/0067 |
| | | | 398/17 |
| 2017/0310538 A1* | 10/2017 | Cai | H04J 3/1652 |
| 2020/0266884 A1* | 8/2020 | Li | H04B 7/18584 |
| 2024/0080260 A1* | 3/2024 | Kunjidhapatham | H04L 45/22 |

* cited by examiner

*Primary Examiner* — Chris Parry
*Assistant Examiner* — Dixon F Dabipi

(57) ABSTRACT

Disclosed herein are optical networks and nodes, including a head-end node comprising a controller and a line module. The line module comprises a first processor and first memory storing instructions that when executed by the first processor cause the first processor to receive fault information, generate a fault packet and a fault trigger request that include a sequence number, a sequence reset time, and the fault information, and send the fault packet via a first network path and the fault trigger request via a second network path to the controller. The controller comprises a second processor, second memory storing second instructions, and packet forwarding circuitry configured to receive and automatically forward the fault packet to a tail-end optical node. The second instructions cause the second processor to receive the fault trigger request, process the fault trigger request, and send the fault trigger request to the tail end optical node.

7 Claims, 10 Drawing Sheets

FAST AND RELIABLE INTER-NETWORK ELEMENT OPTICAL PROTECTION SWITCHING

CROSS REFERENCE TO RELATED APPLICATION

This application claims the benefit of U.S. Provisional Patent Application No. 63/403,639, which was filed on Sep. 2, 2022, the contents of which are incorporated herein by reference in their entirety.

BACKGROUND

Communication networks, in particular fiber optics networks, are subject to a wide variety of failures caused by natural disasters, wear out, patch-cable cuts and so on. Such failures may affect network functionalities such as data transmission and reception. To circumvent these drawbacks, most fiber optics networks use channel protection schemes for its optical layer. As soon as a failure in the network is detected, these channel protection schemes may divert the affected traffic to another fault-free path in the network. For example, under a fault-free condition, the traffic is transported along a working path. However, if a failure is detected on that path, the channel protection scheme may switch the traffic to a protecting path that was not affected by the failure.

Current protection schemes at optical layers are similar to protection schemes at digital layers. Specifically, both working and protecting paths are simultaneously monitored for failure, and in case of a network failure, an Automatic Protection Switching (APS) selects a healthier channel from which to source traffic. Although current protection schemes may satisfy sub-50 millisecond requirements for traffic recovery, they are costly to implement. Thus, it would be desirable to have a method and apparatus that provides sub-50 millisecond traffic recovery time (protection switching time) without costly implementation.

Conventionally, software-based forwarding has been used in networks requiring inter-domain packet forwarding. While software-based forwarding has proven reliable, lowering the fault relay time has been difficult, especially when a fault source and destination are hosted on different nodes and/or are situated on different network layers (e.g., a fault source in a digital layer (Layer-1) and a destination in an optical layer (Layer-0)).

SUMMARY

The systems and methods described herein solve these and other problems by providing fault propagation via both a fast path (hardware-assisted digital fault relay) that significantly reduces fault relay time, which, in turn reduces the traffic recovery time and a slow path (software-based digital fault relay) that ensures reliability.

In one aspect, in accordance with some implementations, the specification describes methods and systems including a head-end node, comprising: a node controller comprising a first processor, a first non-transitory processor-readable medium storing first processor-executable instructions, a first network switch configured to communicate using a first network path and a second network path, and packet forwarding circuitry forming a portion of the first network path; and a digital line module comprising a second processor, a second non-transitory processor-readable medium storing second processor-executable instructions, and a second network switch configured to communicate using the first communication network and the second communication network; wherein the second processor-executable instructions, when executed by the second processor, cause the second processor to: receive fault information related to a fault; generate a fault packet comprising a packet header and the fault information, the packet header including a first sequence number and a first sequence reset time; generate a fault trigger request comprising request parameters and the fault information, the request parameters including the first sequence number and the first sequence reset time; and send the fault packet and the fault trigger request to the node controller, the fault packet sent via the first network path and the fault trigger request sent via the second network path; and wherein the packet forwarding circuitry of the node controller is configured to: receive the fault packet and automatically forward the fault packet to a third network switch of a second node controller of a tail-end optical node; and wherein the first processor-executable instructions, when executed, cause the first processor of the node controller to receive the fault trigger request, process the fault trigger request, and send the fault trigger request to a third processor of the tail end optical node.

In another aspect, in accordance with some implementations, the specification describes methods and systems including a tail-end optical node, comprising: an optical protection switching module comprising a first processor, a first non-transitory processor-readable medium storing first processor-executable instructions, a stored sequence number, and a stored sequence reset time, a first line port connected to a working path, a second line port connected to a protection path, a system port, and an optical switch coupled to the first line port to receive first optical signals from the working path and the second line port to receive second optical signals from the protection path for selectively switching optical signals from the first line port or the second line port to the system port; and a node controller comprising a second processor, a second non-transitory processor-readable medium storing second processor-executable instructions, and packet forwarding circuitry, wherein the packet forwarding circuitry is configured to receive fault packets via a first network path and the second processor is configured to receive fault packets via a second network path; wherein the packet forwarding circuitry receives a first fault packet comprising a first packet header and fault information related to a fault, the first packet header including a first sequence number and a first sequence reset time and automatically sends the first fault packet to the optical protection switching module; and wherein the second processor receives a first fault trigger request comprising first request parameters and the fault information related to the fault, the first request parameters including the first sequence number and the first sequence reset time, and the second processor-executable instructions cause the second processor to process the first fault trigger request and send the processed first fault trigger request to the optical protection switching module; and wherein the first processor-executable instructions, when executed by the first processor, cause the first processor to: receive, at a first instant in time, the first fault packet and process the first fault packet by comparing the first sequence number and the first sequence reset time to the stored sequence number and the stored sequence reset time stored in the first non-transitory processor-readable medium and, if the first sequence number is greater than the stored sequence number and the first sequence reset time is equal to the stored sequence reset time, replace the stored sequence number with the first sequence number and the stored sequence reset time with the first sequence reset time in the first non-transitory processor-readable medium and switch the first line port or the second line port to the system port on the optical switch based on the fault information; and receive, at a second instant in time later than the first instant in time, the processed first fault trigger request and process the first fault trigger request by comparing the first sequence number and the first sequence reset time to the stored sequence number and the stored sequence reset time stored in the first non-transitory processor-readable medium and, if the first sequence number is equal to or less than the stored sequence number and the first sequence reset time is equal to or less than the stored sequence reset time number, discard the fault information of the first fault trigger request.

In another aspect, in accordance with some implementations, the specification describes methods and systems including a hybrid node, comprising: a node controller comprising a first processor, a first non-transitory processor-readable medium storing first processor-executable instructions, a first network switch configured to communicate using a first network path and a second network path, and packet forwarding circuitry forming a portion of the first network path; and; an optical protection switching module comprising a second processor, a second non-transitory processor-readable medium storing second processor-executable instructions, a stored sequence number, and a stored sequence reset time, a first line port connected to a working path, a second line port connected to a protection path, a system port, and an optical switch coupled to the first line port to receive first optical signals from the working path and the second line port to receive second optical signals from the protection path for selectively switching optical signals from the first line port or the second line port to the system port; and a digital line module comprising a third processor, a third non-transitory processor-readable medium storing third processor-executable instructions, and a second network switch configured to communicate using the first network path and the second network path; wherein the third processor-executable instruction, when executed by the third processor, cause the third processor to: receive a fault signal including fault information related to a fault; generate a first fault packet comprising a first packet header and the fault information, the first packet header including a first sequence number and a first sequence reset time; generate a first fault trigger request comprising first request parameters and the fault information, the first request parameters including the first sequence number and the first sequence reset time; and send the first fault packet and the first fault trigger request to the node controller, the first fault packet sent via the first network path and the first fault trigger request sent via the second network path; and wherein the packet forwarding circuitry of the node controller is configured to: receive the first fault packet and automatically forward the first fault packet to the optical protection switching module; and wherein the first processor-executable instructions, when executed, cause the first processor of the node controller to receive the first fault trigger request, process the first fault trigger request, and send the first fault trigger request to the optical protection switching module; wherein the second processor-executable instructions, when executed by the second processor, cause the second processor to: receive, at a first instant in time, the first fault packet and process the first fault packet by comparing the first sequence number and the first sequence reset time to the stored sequence number and the stored sequence reset time stored in the second non-transitory processor-readable medium and, if the first sequence number is greater than the stored sequence number and the first sequence reset time is equal to the stored sequence reset time, replace the stored sequence number with the first sequence number and the stored sequence rest time with the first sequence reset time in the second non-transitory processor-readable medium and switch the first line port or the second line port to the system port on the optical switch based on the fault information; and receive, at a second instant in time later than the first instant in time, the processed first fault trigger request and further process the processed first fault trigger request by comparing the first sequence number and the first sequence reset time to the stored sequence number and the stored sequence reset time stored in the second non-transitory processor-readable medium and, if the first sequence number is equal to the stored sequence number and the first sequence reset time is equal to the stored sequence reset time number, discard the fault information of the first fault trigger request.

In another aspect, in accordance with some implementations, the specification describes methods and systems including an optical network, comprising: a head-end node, comprising: a first node controller comprising a first processor, a first non-transitory processor-readable medium storing first processor-executable instructions, a first network switch configured to communicate using a first network path and a second network path, and first packet forwarding circuitry forming a portion of the first network path; and a line module comprising a second processor, a second non-transitory processor-readable medium storing second processor-executable instructions, and a second network switch configured to communicate using the first communication network and the second communication network; wherein the second processor-executable instructions, when executed by the second processor, cause the second processor to: receive fault information related to a fault; generate a fault packet comprising a packet header and the fault information, the packet header including a first sequence number and a first sequence reset time; generate a fault trigger request comprising request parameters and the fault information, the request parameters including the first sequence number and the first sequence reset time; and send the fault packet and the fault trigger request to the node controller, the fault packet sent via the first network path and the fault trigger request sent via the second network path; and wherein the packet forwarding circuitry of the node controller is configured to: receive the fault packet and automatically forward the fault packet to a third network switch of a second node controller of the tail-end node; and wherein the first processor-executable instructions, when executed, cause the first processor of the first node controller to receive the fault trigger request, process the fault trigger request, and send the fault trigger request to a fourth processor of the tail end optical node; and wherein the tail-end node comprises: an optical protection switching module comprising a third processor, a third non-transitory processor-readable medium storing third processor-executable instructions, a stored sequence number, and a stored sequence reset time, a first line port connected to a working path, a second line port connected to a protection path, a system port, and an optical switch coupled to the first line port to receive first optical signals from the working path and the second line port to receive second optical signals from the protection path for selectively switching optical signals from the first line port or the second line port to the system port; and the second node controller comprising the fourth processor, a fourth non-transitory processor-readable medium storing fourth processor-executable instructions, and second packet forwarding circuitry, wherein the second packet forwarding circuitry is configured to receive fault packets via the first network path and the fourth processor is configured to receive the fault trigger requests via the second network path; wherein the second packet forwarding circuitry receives the first fault packet comprising the first packet header and fault information related to the fault, the first packet header including the first sequence number and the first sequence reset time and automatically sends the first fault packet to the optical protection switching module; and wherein the second processor receives the first fault trigger request comprising first request parameters and the fault information related to the fault, the first request parameters including the first sequence number and the first sequence reset time, and the second processor-executable instructions cause the fourth processor to process the first fault trigger request and send the processed first fault trigger request to the optical protection switching module; and wherein the third processor-executable instructions, when executed by the third processor, cause the third processor to: receive, at a first instant in time, the first fault packet and process the first fault packet by comparing the first sequence number and the first sequence reset time to the stored sequence number and the stored sequence reset time stored in the third non-transitory processor-readable medium and, if the first sequence number is greater than the stored sequence number and the first sequence reset time is equal to the stored sequence reset time, replace the stored sequence number with the first sequence number and the stored sequence reset time with the first sequence reset time in the third non-transitory processor-readable medium and switch the first line port or the second line port to the system port on the optical switch based on the fault information; and receive, at a second instant in time later than the first instant in time, the processed first fault trigger request and process the first fault trigger request by comparing the first sequence number and the first sequence reset time to the stored sequence number and the stored sequence reset time stored in the third non-transitory processor-readable medium and, if the first sequence number is equal to or less than the stored sequence number and the first sequence reset time is equal to or less than the stored sequence reset time number, discard the fault information of the first fault trigger request.

BRIEF DESCRIPTION OF DRAWINGS

The accompanying drawings, which are incorporated in and constitute a part of this specification, illustrate one or more implementations described herein and, together with the description, explain these implementations. The drawings are not intended to be drawn to scale, and certain features and certain views of the figures may be shown exaggerated, to scale or in schematic in the interest of clarity and conciseness. Not every component may be labeled in every drawing. Like reference numerals in the figures may represent and refer to the same or similar element or function. In the drawings.

DETAILED DESCRIPTION

Figure 1:
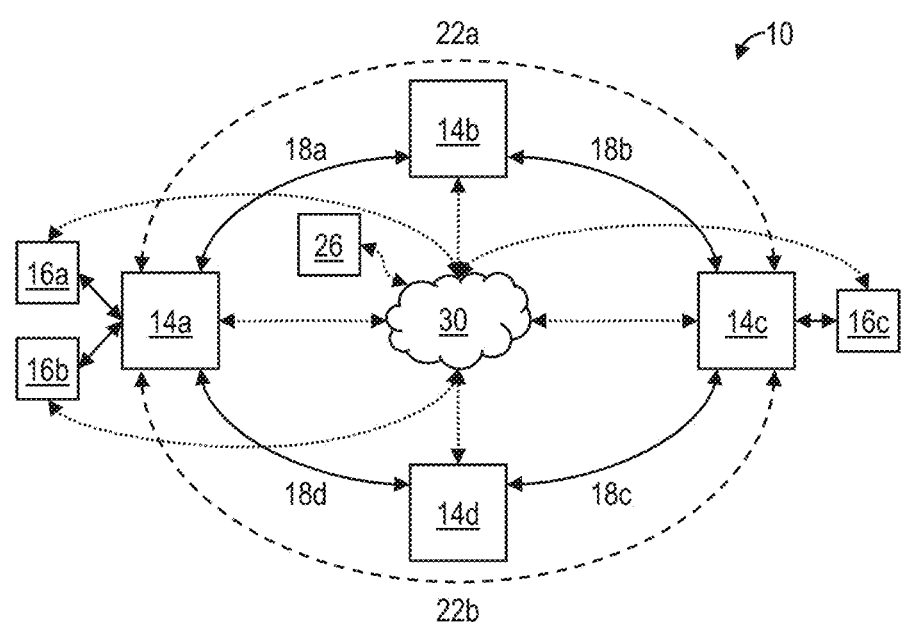
FIG. 1 is a diagrammatic representation of hardware forming an exemplary implementation of network architecture constructed in accordance with the present disclosure.

The following detailed description of example embodiments refers to the accompanying drawings. The same reference numbers in different drawings may identify the same or similar elements.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the inventive concept. This description should be read to include one or more and the singular also includes the plural unless it is obvious that it is meant otherwise.

Further, use of the term "plurality" is meant to convey "more than one" unless expressly stated to the contrary.

As used herein, qualifiers like "about," "approximately," and combinations and variations thereof, are intended to include not only the exact amount or value that they qualify, but also some slight deviations therefrom, which may be due to manufacturing tolerances, measurement error, wear and tear, stresses exerted on various parts, and combinations thereof, for example.

As used herein, the term "substantially" means that the subsequently described parameter, event, or circumstance completely occurs or that the subsequently described parameter, event, or circumstance occurs to a great extent or degree. For example, the term "substantially" means that the subsequently described parameter, event, or circumstance occurs at least 90% of the time, or at least 91%, or at least 92%, or at least 93%, or at least 94%, or at least 95%, or at least 96%, or at least 97%, or at least 98%, or at least 99%, of the time, or means that the dimension or measurement is within at least 90%, or at least 91%, or at least 92%, or at least 93%, or at least 94%, or at least 95%, or at least 96%, or at least 97%, or at least 98%, or at least 99%, of the referenced dimension or measurement.

The use of the term "at least one" or "one or more" will be understood to include one as well as any quantity more than one. In addition, the use of the phrase "at least one of X, V, and Z" will be understood to include X alone, V alone, and Z alone, as well as any combination of X, V, and Z.

The use of ordinal number terminology (i.e., "first", "second", "third", "fourth", etc.) is solely for the purpose of differentiating between two or more items and, unless explicitly stated otherwise, is not meant to imply any sequence or order or importance to one item over another or any order of addition.

As used herein any reference to "one implementation" or "an implementation" means that a particular element, feature, structure, or characteristic described in connection with the implementation is included in at least one embodiment. The appearances of the phrase "in one implementation" in various places in the specification are not necessarily all referring to the same implementation.

Circuitry, as used herein, may be analog and/or digital components, or one or more suitably programmed processors (e.g., field programmable gate array (FPGA), microprocessors, central processing unit, etc.) and associated hardware and software, or hardwired logic. Also, "components" may perform one or more functions. The term "component" may include hardware, such as a processor (e.g., microprocessor, central processing unit, etc.), a combination of hardware and software, and/or the like. Software may include one or more computer executable instructions that when executed by one or more components cause the component to perform a specified function. It should be understood that the algorithms described herein may be stored on one or more non-transitory memory. Exemplary non-transitory memory may include random access memory, read only memory, flash memory, and/or the like. Such non-transitory memory may be electrically based, optically based, and/or the like.

As used herein, the terms "network-based," "cloud-based," and any variations thereof, are intended to include the provision of configurable computational resources on demand via interfacing with a computer and/or computer network, with software and/or data at least partially located on a computer and/or computer network.

As used herein, the term "serial" or "sequential" may refer to an order of items or events. In some implementations, the order may be time-based, though it will be understood that other criteria may be used to order the items or events. Time-based sequences may be, for example, sequences based on a time that an event/item is received, a time that an event/item is generated, or other time associated with the event/item.

As used herein, a digital fault or fault signal is a fault condition that is reported and may be determined after coherent detection in a transponder (e.g., Line card). The fault condition may include one or more of the following: Loss of Frame (LOS), based on one or more of an Out of Frame (OOF) defect, an Out of Multi-frame (OOM) defect, or a Loss of Multi-frame (LOM) defect; a Backward Defect Indication (BDI) fault, a Remote BDI (RBDI) fault, a Backward signal degrade (BSD) fault, an Alarm Indication Signal (AIS), an Open Connection Indication (OCI), and/or a remote BSD (RBSD) fault. A BDI is an indication sent upstream by a downstream optical node detecting LOF. This information may be carried in an SDFEC overhead.

In accordance with the present disclosure, Layer 1 fault information from a source (i.e., the optical node where the optical link in which the fault was detected is sourced) to a destination (i.e., the optical node where the optical link in which the fault was detected is terminated) is provided via both a fast path (hardware-assisted digital fault relay) that significantly reduces fault relay time, which, in turn reduces the traffic recovery time and a slow path (software-based digital fault relay) that ensures reliability.

Using the hardware-assisted "fast" relay, switching an optical signal from a working path to a protection path is preferably performed within 50 milliseconds (ms). This 50 ms switching time generally includes: (i) fault detection at the source; (ii) propagation of fault information from the source to the destination; (iii) protection switching at the destination; and (iv) signal recovery at the source. For this reason, propagation of fault information from the source to the destination is preferably performed within 10 ms.

One challenge presented by minimizing the propagation time of the fault information is that the fault information is passed between three separate communication domains or segments: (i) a source line module to a source node controller; (ii) the source node controller to a destination node controller; and (iii) the destination node controller to a destination optical protection switching module (OPSM). Where the fault source and the fault destination are housed in the same optical node (e.g., a hybrid node), communication segment (ii) may be not applicable.

To accommodate the propagation across the communication segments, an emulated communication network, such as a virtual local area network (VLAN), is instantiated for a given flow from the source to the destination using packet forwarding information, such as a flow identifier (Flow ID), contained within packet headers of fault packets containing the fault information. The fault packets may be forwarded across the nodes of the optical network using conventional IP routing functions. Circuitry, such as a field-programmable gate array (FPGA), on a node controller may extract the Flow ID from an incoming fault packet, retrieve a new Flow ID from a lookup table, and modify the packet header of an outgoing fault packet to include the new Flow ID for routing the fault packet over the next communication segment. Thus, software-based forwarding may be avoided in the propagation of the fault packet on the fast path (hardware-assisted digital fault relay) that significantly reduces fault relay time, which, in turn reduces the traffic recovery time while a fault trigger request may be simultaneously sent on the slow path (software-based digital fault relay) that ensures reliability.

Referring now to FIG. 1, shown therein is a diagrammatic view of an exemplary implementation of an optical network 10 constructed in accordance with the present disclosure. The optical network 10 may include a plurality of optical nodes 14*a-n* (hereinafter the "optical nodes 14"). In the implementation shown, the optical network 10 includes four optical nodes 14*a-d*, including a first optical node 14*a*, a second optical node 14*b*, a third optical node 14*c*, and a fourth optical node 14*d*; however, in other implementations, the optical network 10 may include more or less than four optical nodes 14*a-d*.

The optical network 10 may include any type of network that uses light as a transmission medium. For example, the optical network 10 may include a fiber-optic based network, an optical transport network, a light-emitting diode network, a laser diode network, an infrared network, a wireless optical network, a wireless network, combinations thereof, and/or other types of optical networks.

Particular ones of the optical nodes 14 may be denoted as terminal nodes for an optical signal being transmitted within the optical network 10. Each of the terminal nodes may either transmit or receive the optical signal being transmitted within the optical network 10. The terminal nodes may include a head-end node (also referred to as a "source node") and a tail-end node (also referred to as a "destination node"). In the implementation shown, the first optical node 14*a* (hereinafter the "head-end node 14*a*") is functioning as a head-end node and the third optical node 14*c* (hereinafter the "tail-end node 14*c*") is functioning as a tail-end node (the head-end node 14*a* and the tail-end node 14*c*, collectively the "terminal nodes 14*a*, 14*c*").

As shown in FIG. 1, one or more of the terminal nodes 14*a*, 14*c* may be connected to one or more transponder node 16 (hereinafter the "transponder nodes 16"), shown in FIG. 1 as a first transponder node 16*a* and a second transponder node 16*b* connected to the head-end node 14*a* and a third transponder node 16*c* connected to the tail-end node 14*c*. The transponder nodes 16 may provide optical signals to the optical nodes 14 to which the transponder nodes 16 are connected.

Other ones of the optical nodes 14 between the terminal nodes 14*a*, 14*c* may be denoted as intermediate nodes. In the implementation shown, the second optical node 14*b* (hereinafter the "first intermediate node 14*b*") and the fourth optical node 14*d* (hereinafter the "second intermediate node 14*d*") are functioning as intermediate nodes (the first intermediate node 14*b* and the second intermediate node 14*d*, collectively the "intermediate nodes 14*b*, 14*d*").

Each of the optical nodes 14 may be implemented in a variety of ways, non-exclusive examples of which including optical line terminals (OLTs), optical cross connects (OXCs), optical line amplifiers (OAs), optical add/drop multiplexer (OADMs) and/or reconfigurable optical add/ drop multiplexers (ROADMs), interconnected by way of intermediate links. OLTs may be used at either end of a connection or intermediate link. OADM/ROADMs may be used to add, terminate and/or reroute wavelengths or fractions of wavelengths. Optical nodes 14 are further described in U.S. Pat. No. 7,995,921 titled "Banded Semiconductor Optical Amplifiers and Waveblockers", U.S. Pat. No. 7,394, 953 titled "Configurable Integrated Optical Combiners and Decombiners", and U.S. Pat. No. 8,223,803, titled "Programmable Time Division Multiplexed Switching," the entire contents of each of which are hereby incorporated herein by reference in its entirety.

Each of the optical nodes 14 may be connected to each other by optical links 18 (hereinafter the "optical links 18*a-n*"). Each of the optical links 18 may be a fiber optic cable and may be uninterrupted (i.e., having no break in the fiber optic cable) or may have one or more optical node 14 disposed thereon and positioned in between each of the optical nodes 14. In the implementation shown, the optical network 10 includes four optical links 18*a-d*, including a first optical link 18*a* between the head-end node 14*a* and the first intermediate node 14*b*, a second optical link 18*b* between the first intermediate node 14*b* and the tail-end node 14*c*, a third optical link 18*c* between the second intermediate node 14*d* and the tail-end node 14*c*, and a fourth optical link 18*d* between the head-end node 14*a* and the second intermediate node 14*d*; however, in other implementations, the optical network 10 may include more or less than four optical links 18*a-d*.

An optical signal being transmitted within the optical network 10 from the head-end node 14*a* to the tail-end node 14*c* may traverse one or more paths through the optical network 10, shown in FIG. 1 as a working path 22*a* and a protection path 22*b*. The working path 22*a* may be formed between the head-end node 14*a* and the tail-end node 14*c* through the first intermediate node 14*b* and includes the first optical link 18*a* and the second optical link 18*b* as components thereof. The protection path 22*b* may be formed between the head-end node 14*a* and the tail-end node 14*c* through the second intermediate node 14*d* and includes the third optical link 18*c* and the fourth optical link 18*d* as components thereof.

While the working path 22*a* and the protection path 22*b* are described as traversable by an optical signal being transmitted from the head-end node 14*a* to the tail-end node 14*c*, each of the working path 22*a* and the protection path 22*b* may be bidirectional; that is, each of the working path 22*a* and the protection path 22*b* may be traversable by an optical signal being transmitted from the tail-end node 14*c* to the head-end node 14*a*.

The working path 22*a* may be described as a default path for the optical signal to traverse; that is, the working path 22*a* may be a data path configured to carry data traffic while there is no failure or fault signal on the working path 22*a*. The protection path 22*b* may be described as a backup path for the optical signal to traverse if the optical signal is unable to traverse the working path 22*a*; that is, the protection path 22*b* may be a data path configured to carry data traffic while there is a failure or fault signal on the working path 22*a*.

If there is a failure or fault signal on the working path 22*a*, then the working path 22*a* may be said to have failed. As described further below, if the working path 22*a* is failed, then data traffic may be directed from the working path 22*a* to the protection path 22*b*. If the failure or fault signal is resolved, then the working path 22*a* may be said to have recovered from failure. The working path 22*a* may be revertive or non-revertive. Revertive means that data traffic is directed from the protection path 22b to the working path 22a after the working path 22a recovers from failure, while non-revertive means that data traffic is not directed from the protection path 22b to the working path 22a after the working path 22a recovers from failure.

In some implementations, a user may interact with a computer system 26 (e.g., via a user device (not shown)) that may be used to communicate with one or more of the optical nodes 14 and the transponder nodes 16 via a communication network 30. Each element of the computer system 26 may be partially or completely network-based or cloud-based and may or may not be located in a single physical location. In some implementations, the communication network 30 is a Layer 3 communication network.

As further described below, in some implementations, the computer system 26 may comprise a processor 42 and a memory 50 having a data store 58 that may store data such as network element version information, firmware version information, sensor data, system data, metrics, logs, tracing, and the like in a raw format as well as transformed data that may be used for tasks such as reporting, visualization, analytics, signal routing, power loading operations and/or coordination, etc. The data store 58 may include structured data from relational databases, semi-structured data, unstructured data, time-series data, and binary data. The data store 58 may be a database, a remote accessible storage, or a distributed filesystem. In some implementations, the data store 58 may be a component of an enterprise network.

In some implementations, the computer system 26 is connected to one or more of the optical nodes 14 and the transponder nodes 16 via the communication network 30. In this way, the computer system 26 may communicate with the optical nodes 14 and the transponder nodes 16, and may, via the communication network 30, transmit to or receive data from the optical nodes 14 and the transponder nodes 16. In other implementations, the computer system 26 may be integrated into each of the optical nodes 14 and the transponder nodes 16 and/or may communicate with one or more pluggable card within the optical nodes 14 and the transponder nodes 16. In some implementations, the computer system 26 may be a remote network element.

The communication network 30 may permit bi-directional communication of information and/or data between the computer system 26, the optical nodes 14, and/or the transponder nodes 16. The communication network 30 may interface with the computer system 26, the optical nodes 14, and/or the transponder nodes 16 in a variety of ways. For example, in some implementations, the communication network 30 may interface by optical and/or electronic interfaces, and/or may use a plurality of network topographies and/or protocols including, but not limited to, Ethernet, TCP/IP, circuit switched path, combinations thereof, and/or the like. The communication network 30 may utilize a variety of network protocols to permit bi-directional interface and/or communication of data and/or information between the computer system 26, the optical nodes 14, and/or the transponder nodes 16.

The communication network 30 may be almost any type of network. For example, in some implementations, the communication network 30 may be a version of an Internet network (e.g., exist in a TCP/IP-based network). In one implementation, the communication network 30 is the Internet. It should be noted, however, that the communication network 30 may be almost any type of network and may be implemented as the World Wide Web (or Internet), a local area network (LAN), a wide area network (WAN), a metropolitan network, a wireless network, a cellular network, a Bluetooth network, a Global System for Mobile Communications (GSM) network, a code division multiple access (CDMA) network, a 3G network, a 4G network, an LTE network, a 5G network, a satellite network, a radio network, an optical network, a cable network, a public switched telephone network, an Ethernet network, combinations thereof, and/or the like.

If the communication network 30 is the Internet, a primary user interface of the computer system 26 may be delivered through a series of web pages or private internal web pages of a company or corporation, which may be written in hypertext markup language, JavaScript, or the like, and accessible by the user. It should be noted that the primary user interface of the computer system 26 may be another type of interface including, but not limited to, a Windows-based application, a tablet-based application, a mobile web interface, a VR-based application, an application running on a mobile device, and/or the like. In one implementation, the communication network 30 may be connected to the user device (not shown), the computer system 26, the optical nodes 14, and the transponder nodes 16.

The number of devices and/or networks illustrated in FIG. 1 is provided for explanatory purposes. In practice, there may be additional devices and/or networks, fewer devices and/or networks, different devices and/or networks, or differently arranged devices and/or networks than are shown in FIG. 1. Furthermore, two or more of the devices illustrated in FIG. 1 may be implemented within a single device, or a single device illustrated in FIG. 1 may be implemented as multiple, distributed devices. Additionally, or alternatively, one or more of the devices of the optical network 10 may perform one or more functions described as being performed by another one or more of the devices of the optical network 10. Devices of the computer system 26 may interconnect via wired connections, wireless connections, or a combination thereof. For example, in one embodiment, the user device and the computer system 26 may be integrated into the same device; that is, the user device may perform functions and/or processes described as being performed by the computer system 26, described below in more detail.

Figure 2:
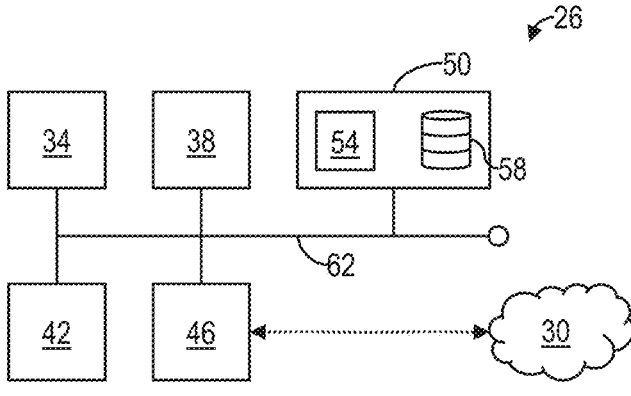
FIG. 2 is a diagrammatic representation of hardware forming an exemplary computer system in accordance with one implementation of the present disclosure.

Referring now to FIG. 2, shown therein is a diagrammatic view of an exemplary implementation of a computer system 26 constructed in accordance with the present disclosure. In some implementations, the computer system 26 may include, but is not limited to, implementations as a personal computer, a cellular telephone, a smart phone, a network-capable television set, a tablet, a laptop computer, a desktop computer, a network-capable handheld device, a server, a digital video recorder, a wearable network-capable device, a virtual reality/augmented reality device, and/or the like.

The computer system 26 may include one or more input device 34 (hereinafter the "input device 34"), one or more output device 38 (hereinafter the "output device 38"), one or more processor 42 (hereinafter the "processor 42"), one or more communication device 46 (hereinafter the "communication device 46") capable of interfacing with the communication network 30, one or more non-transitory processor-readable medium 50 (hereinafter the "memory 50") storing processor-executable code and/or one or more software application 54 including, for example, a web browser capable of accessing a website and/or communicating information and/or data over a wireless or wired network (e.g., the communication network 30) and/or the like, and a data store 58. The input device 34, the output device 38, the processor 42, the communication device 46, and the memory 50 may be connected via a path 62 such as a data bus that permits communication among the components of the computer system 26.

The input device 34 may be capable of receiving information input from the user, another computer, and/or the processor 42, and transmitting such information to other components of the computer system 26 and/or the communication network 30. The input device 34 may include, but is not limited to, implementation as a keyboard, a touchscreen, a mouse, a trackball, a microphone, a camera, a fingerprint reader, an infrared port, a slide-out keyboard, a flip-out keyboard, a cell phone, a PDA, a remote control, a fax machine, a wearable communication device, a network interface, combinations thereof, and/or the like, for example.

The output device 38 may be capable of outputting information in a form perceivable by the user, another computer system, and/or the processor 42. For example, implementations of the output device 38 may include, but are not limited to, a computer monitor, a screen, a touchscreen, a speaker, a website, a television set, a smart phone, a PDA, a cell phone, a fax machine, a printer, a laptop computer, a haptic feedback generator, a network interface, combinations thereof, and the like, for example. It is to be understood that in some exemplary embodiments, the input device 34 and the output device 38 may be implemented as a single device, such as, for example, a touchscreen of a computer, a tablet, or a smartphone. It is to be further understood that as used herein the term "user" is not limited to a human being, and may comprise a computer, a server, a website, a processor, a network interface, a user terminal, a virtual computer, combinations thereof, and/or the like, for example.

In some implementations, the processor 42 may comprise one or more processor 42 working together, or independently, to read and/or execute processor executable code and/or data, such as stored in the memory 50. The processor 42 may be capable of creating, manipulating, retrieving, altering, and/or storing data structures into the memory 50. Each element of the computer system 26 may be partially or completely network-based or cloud-based, and may or may not be located in a single physical location.

Exemplary implementations of the processor 42 may include, but are not limited to, a digital signal processor (DSP), a central processing unit (CPU), a field programmable gate array (FPGA), a microprocessor, a multi-core processor, an application specific integrated circuit (ASIC), combinations, thereof, and/or the like, for example. The processor 42 may be capable of communicating with the memory 50 via the path 62 (e.g., data bus). The processor 42 may be capable of communicating with the input device 34 and/or the output device 38.

The processor 42 may be further capable of interfacing and/or communicating with the optical nodes 14 and the transponder nodes 16 via the communication network 30 using the communication device 46. For example, the processor 42 may be capable of communicating via the communication network 30 by exchanging signals (e.g., analog, digital, optical, and/or the like) via one or more ports (e.g., physical or virtual ports) using a network protocol (e.g., TCP/IP) to provide information to the optical network 10 (i.e., the optical nodes 14 and the transponder nodes 16) and receive information from the optical network 10 (i.e., the optical nodes 14 and the transponder nodes 16).

The memory 50 may store a software application 54 that, when executed by the processor 42, causes the computer system 26 to perform an action such as communicate with, or control, one or more component of the computer system 26, the optical network 10 (e.g., the optical nodes 14 and the transponder nodes 16), and/or the communication network 30.

In some implementations, the memory 50 may be located in the same physical location as the computer system 26, and/or one or more memory 50 may be located remotely from the computer system 26. For example, the memory 50 may be located remotely from the computer system 26 and communicate with the processor 42 via the communication network 30. Additionally, when more than one memory 50 is used, a first memory may be located in the same physical location as the processor 42, and additional memory may be located in a location physically remote from the processor 42. Additionally, the memory 50 may be implemented as a "cloud" non-transitory processor-readable storage memory (i.e., one or more of the memory 50 may be partially or completely based on or accessed using the communication network 30).

In some implementations, the data store 58 may be a time-series database, a vector database, a relational database, or a non-relational database. Examples of such databases include DB2®, Microsoft® Access, Microsoft® SQL Server, Oracle®, mySQL, PostgreSQL, MongoDB, Apache Cassandra, InfluxDB, Prometheus, Redis, Elasticsearch, TimescaleDB, and/or the like. It should be understood that these examples have been provided for the purposes of illustration only and should not be construed as limiting the presently disclosed inventive concepts. The data store 58 may be centralized or distributed across multiple systems.

Figure 3A:
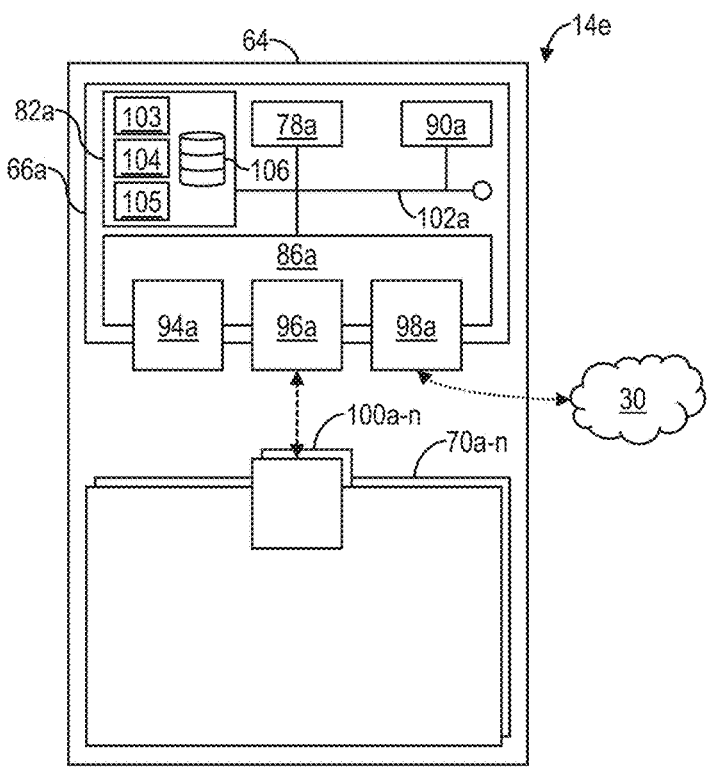
FIG. 3A is a diagrammatic view of an exemplary implementation of a terminal node comprising a chassis containing a node controller and one or more field replaceable unit (FRU) for use in the optical network shown in FIG. 1.
Figure 3B:
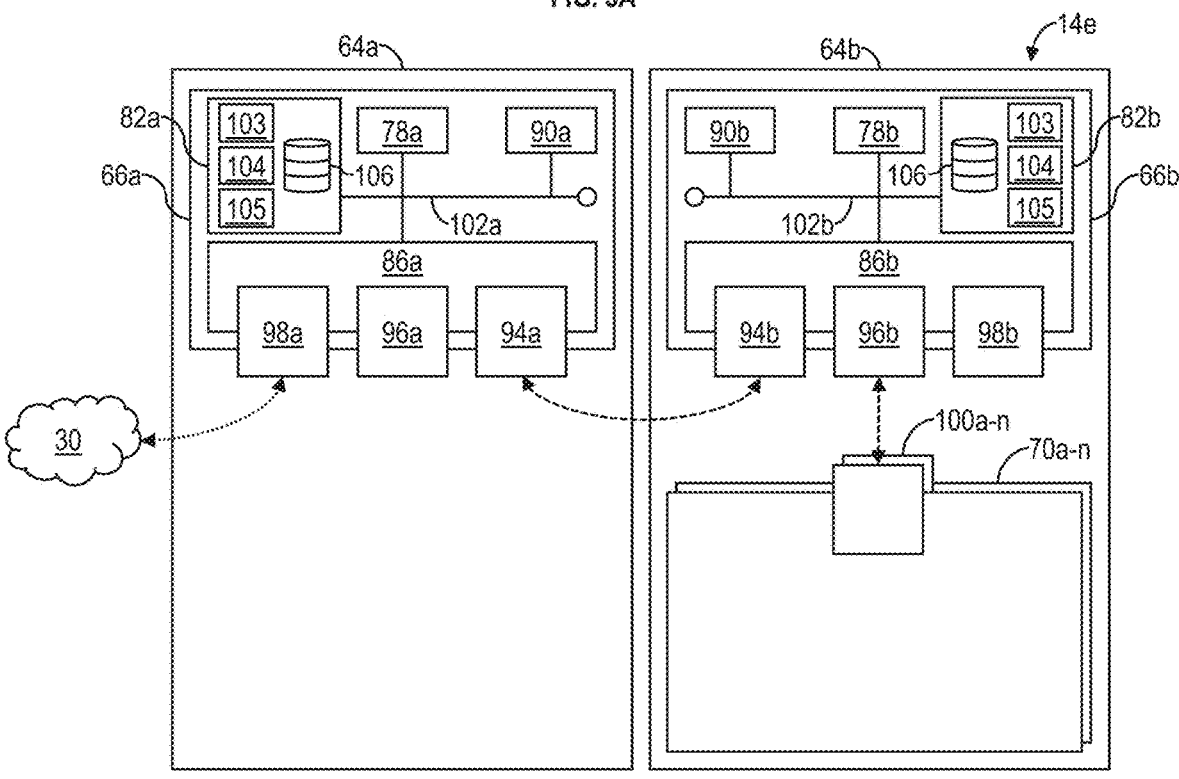
FIG. 3B is a diagrammatic view of an exemplary implementation of a terminal node comprising a first chassis containing a node controller and a second chassis containing a shelf controller and one or more FRU for use in the optical network shown in FIG. 1.

Referring now to FIGS. 3A-3B, shown therein are diagrammatic views of exemplary implementations of a terminal node 14e constructed in accordance with the present disclosure. The terminal node 14e may be an implementation of one of the terminal nodes 14a, 14c or the transponder nodes 16. The terminal node 14e generally comprises one or more chassis 64, such as chassis 64 shown in FIG. 3A or a first chassis 64a and a second chassis 64b shown in FIG. 3B, containing one or more controller, such as a node controller 66a shown in FIGS. 3A and 3B and a shelf controller 66b shown in FIG. 3B, for example, and one or more field-replaceable unit (FRU) 70a-n (hereinafter the "FRUs 70"), such as a line module 70a (shown in FIG. 4A) and an OPSM 70b (shown in FIG. 4B), for example.

As shown in FIGS. 3A-3B, the node controller 66a may comprise one or more processor 78a (hereinafter the "node controller processor 78a"), one or more non-transitory processor-readable medium 82a (hereinafter the "node controller memory 82a"), a network switch 86a (hereinafter the "node controller network switch 86a"), and packet forwarding circuitry, shown in FIGS. 3A-3B as field-programmable gate array 90a (hereinafter the "node controller FPGA 90a"). While the node controller processor 78a is shown as being separate from the node controller FPGA 90a, in some implementations, the node controller processor 78a may be integrated into the node controller FPGA 90a. The node controller processor 78a, the node controller memory 82a, the network switch 86a, and the node controller FPGA 90a may be connected via a path 102a such as a data bus that permits communication among the components of the node controller 66a.

The node controller 66a may be operable to monitor a connection status of the FRUs 70 (i.e., plugged in or plugged out) and a control plane state of the communication device 46. As described further below, the connection status and the control plane state may be provided to the node controller 66a by an embedded device of one or more of the FRUs 70.

The network switch 86*a* may comprise one or more of a first interface, shown as Nodal Control and Timing (NCT) interface 94*a* (hereinafter the "node controller NCT interface 94*a*"), a second interface, shown as FRU interface 96*a* (hereinafter the "node controller FRU interface 96*a*") and a third interface, shown as auxiliary (AUX) interface 98*a* (hereinafter the "node controller AUX interface 98*a*").

As further shown in FIG. 3B, the shelf controller 66*b* may comprise one or more processor 78*b* (hereinafter the "shelf controller processor 78*b*") (the node controller processor 78*a* and the shelf controller processor 78*b*, collectively the "controller processors 78"), one or more non-transitory processor-readable medium 82*b* (hereinafter the "shelf controller memory 82*b*") (the node controller memory 82*a* and the shelf controller memory 82*b*, collectively the "controller memories 82"), a network switch 86*b* (hereinafter the "shelf controller network switch 86*b*") (the node controller network switch 86*a* and the shelf controller network switch 86*b*, collectively the "controller network switches 86"), and packet forwarding circuitry, shown in FIG. 3B as field-programmable gate array 90*b* (hereinafter the "shelf controller FPGA 90*b*") (the node controller FPGA 90*a* and the shelf controller FPGA 90*b*, collectively the "controller FPGAs 90"). While the shelf controller processor 78*b* is shown as being separate from the shelf controller FPGA 90*b*, in some implementations, the shelf controller processor 78*b* may be integrated into the shelf controller FPGA 90*b*. The shelf controller processor 78*b*, the shelf controller memory 82*b*, the shelf controller network switch 86*b*, and the shelf controller FPGA 90*b* may be connected via a path 102*b* such as a data bus that permits communication among the components of the shelf controller 66*b*.

The shelf controller network switch 86*b* may comprise one or more of a first interface, shown as NCT interface 94*b* (hereinafter the "shelf controller NCT interface 94*b*") (the node controller NCT interface 94*a* and the shelf controller NCT interface 94*b*, collectively the "NCT interfaces 94"), a second interface, shown as FRU interface 96*b* (hereinafter the "shelf controller FRU interface 96*b*") (the node controller FRU interface 96*a* and the shelf controller FRU interface 96*b*, collectively the "line module interfaces 96"), and a third interface, shown as auxiliary (AUX) interface 98*b* (hereinafter the "shelf controller AUX interface 98*b*") (the node controller AUX interface 98*a* and the shelf controller AUX interface 98*b*, collectively the "AUX interfaces 98").

As described in further detail below, the controller network switches 86 may be configured to communicate using communication networks, such as the communication network 30 shown in FIG. 1, the first intra-node communication network 144*a* (shown in FIG. 5A), or the second intra-node communication network 144*b* (shown in FIG. 5A), via one or more of the NCT interfaces 94, the FRU interfaces 96, and the AUX interfaces 98. In some implementations, the controller network switches 86 may be Layer 2/Layer 3 network switches.

As shown in FIG. 3B, the NCT interfaces 94 may be configured to communicate with the NCT interfaces 94 of other controller modules 66, such as when the terminal node 14*e* is provided with both the node controller 66*a* and the shelf controller 66*b*. Further, where the terminal node 14*e* is provided with more than one shelf controller 66*b*, the shelf controller NCT interface 94*b* of a first shelf controller 66*b* may communicate with the node controller NCT interface 94*a* of the node controller 66*a* and/or the shelf controller NCT interface 94*b* of a second shelf controller 66*b*, for example. As further shown in FIGS. 3A-3B, the FRU interfaces 96 may be configured to communicate with one or more controller module interface 100*a*-*n*, such as a line module controller module interface 100*a* (hereinafter the "line module CM interface 100*a*") (shown in FIG. 4A) and an OPSM controller module interface 100*b* (hereinafter the "OPSM CM interface 100*b*") (shown in FIG. 4B) (collectively the "CM interfaces 100"). As further shown in FIGS. 3A-3B, the AUX interfaces 98 may be configured to communicate with the AUX interfaces 98 of other optical nodes 14 and/or other transponder nodes 16 in the optical network 10 via the communication network 30.

One or more of the controller memories 82 may store processor-executable instructions and/or one or more software application 104 (hereinafter the "controller application 104"), a communication application 103, a digital trigger application 105, and a data store 106, for example. The controller application 104, communication application 103, and digital trigger application 105 when executed by the controller processors 78 may cause the controller processors 78 to perform one or more of the methods 400 (shown in FIG. 6A), 438 (shown in FIG. 6B), 500 (shown in FIG. 7), 600 (shown in FIG. 8), 700 (shown in FIG. 9) (or steps thereof) described herein.

In some implementations, the data store 106 may be a time-series database, a vector database, a relational database, or a non-relational database. Examples of such databases include DB2®, Microsoft® Access, Microsoft® SQL Server, Oracle®, mySQL, PostgreSQL, MongoDB, Apache Cassandra, InfluxDB, Prometheus, Redis, Elasticsearch, TimescaleDB, and/or the like. It should be understood that these examples have been provided for the purposes of illustration only and should not be construed as limiting the presently disclosed inventive concepts. The data store 106 may be centralized or distributed across multiple systems.

Figure 4A:
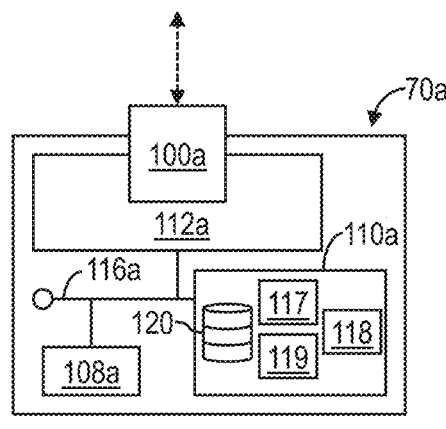
FIG. 4A is a diagrammatic view of an exemplary implementation of a line module for use in the terminal nodes shown in FIGS. 3A and 3B.

Referring now to FIG. 4A, shown therein is a diagrammatic view of an exemplary implementation of a line module 70*a* constructed in accordance with the present disclosure. As shown in FIG. 4A, the line module 70*a* may comprise one or more processor 108*a* (hereinafter the "line module processor 108*a*"), one or more non-transitory processor-readable medium 110*a* (hereinafter the "line module memory 110*a*"), and a network switch 112*a* (hereinafter the "line module network switch 112*a*"). The line module network switch 112*a* may comprise an interface, shown in FIG. 4A as the line module CM interface 100*a*. In some implementations, the line module network switch 112*a* is a Layer 2 network switch; in other implementations, the line module network switch 112*a* is a Layer 2/Layer 3 network switch.

As described in further detail below, the line module network switch 112*a* may be configured to communicate using communication networks, such as the first intra-node communication network 144*a* (shown in FIG. 5A), or the second intra-node communication network 144*b* (shown in FIG. 5A), via the line module CM interface 100*a*, for example. The line module processor 108*a*, the line module memory 110*a*, and the line module network switch 112*a* may be connected via a path 116*a* such as a data bus that permits communication among the components of the line module 70*a*.

The line module memory 110*a* may store processor-executable instructions and/or one or more software application 118 (hereinafter the "line module software application 118"), a communication application 117, a digital trigger application 119, and a data store 120, for example. The line module software application 118, communication application 117, and digital trigger application 119 when executed by the line module processor 108*a* may cause the line module processor 108*a* to perform one or more of the methods 400 (shown in FIG. 6A), 438 (shown in FIG. 6B), 500 (shown in FIG. 7), 600 (shown in FIG. 8), 700 (shown in FIG. 9) (or steps thereof) described herein.

In some implementations, the data store 120 may be a time-series database, a vector database, a relational database, or a non-relational database. Examples of such databases include DB2®, Microsoft® Access, Microsoft® SQL Server, Oracle®, mySQL, PostgreSQL, MongoDB, Apache Cassandra, InfluxDB, Prometheus, Redis, Elasticsearch, TimescaleDB, and/or the like. It should be understood that these examples have been provided for the purposes of illustration only and should not be construed as limiting the presently disclosed inventive concepts. The data store 120 may be centralized or distributed across multiple systems.

As further shown in FIG. 4A, the line module 70*a* may further comprise a coherent transceiver 122 which may include circuitry such as a coherent receiver, a coherent transmitter, combinations thereof, and/or the like. As described herein, the coherent transceiver 122 may be configured to detect a fault in one of the working path 22*a* and the protection path 22*b* and to send fault information related to the fault to the line module processor 108*a*.

Figure 4B:
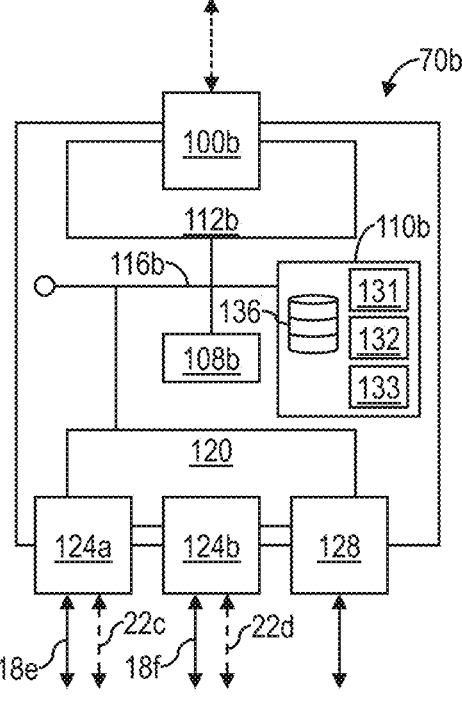
FIG. 4B is a diagrammatic view of an exemplary implementation of an optical protection switching module for use in the terminal nodes shown in FIGS. 3A and 3B.

Referring now to FIG. 4B, shown therein is a diagrammatic view of an exemplary implementation of an OPSM 70*b* constructed in accordance with the present disclosure. As shown in FIG. 4B, the OPSM 70*b* may comprise one or more processor 108*b* (hereinafter the "OPSM processor 108*b*") (the line module processor 108*a* and the OPSM processor 108*b*, collectively the "module processors 108"), one or more non-transitory processor-readable medium 110*b* (hereinafter the "OPSM memory 110*b*") (the line module memory 110*a* and the OPSM memory 110*b*, collectively the "module memories 110"), a network switch 112*b* (hereinafter the "OPSM network switch 112*b*") (the line module network switch 112*a* and the OPSM network switch 112*b*, collectively the "module network switches 112"), an optical switch 124, a first line port 126*a* (hereinafter the "working line port 126*a*"), a second line port 126*b* (hereinafter the "protection line port 126*b*"), and a system port 128.

The OPSM network switch 114*b* may comprise an interface, shown in FIG. 4B as the OPSM CM interface 100*b*. In some implementations, the OPSM network switch 114*b* is a Layer 2 network switch.

As described in further detail below, the OPSM network switch 112*b* may be configured to communicate using communication networks, such as the first intra-node communication network 144*a* (shown in FIG. 5A), or the second intra-node communication network 144*b* (shown in FIG. 5A), via the OPSM CM interface 100*b*, for example. The OPSM processor 108*b*, the OPSM memory 110*b*, the OPSM network switch 112*b*, and the optical switch 124 may be connected via a path 116*b* such as a data bus that permits communication among the components of the OPSM 70*b*.

The OPSM memory 110*b* may store processor-executable instructions and/or one or more software application 132 (hereinafter the "OPSM software application 132"), a communication application 131, a digital trigger application 133, and a data store 136, for example. The OPSM software application 132, communication application 131, and digital trigger application 133 when executed by the OPSM processor 108*b* may cause the OPSM processor 108*b* to perform one or more of the methods 300 (shown in FIG. 7A), 400 (shown in FIG. 7B) (or steps thereof) described herein.

In some implementations, the data store 136 may be a time-series database, a vector database, a relational database, or a non-relational database. Examples of such databases include DB2®, Microsoft® Access, Microsoft® SQL Server, Oracle®, mySQL, PostgreSQL, MongoDB, Apache Cassandra, InfluxDB, Prometheus, Redis, Elasticsearch, TimescaleDB, and/or the like. It should be understood that these examples have been provided for the purposes of illustration only and should not be construed as limiting the presently disclosed inventive concepts. The data store 136 may be centralized or distributed across multiple systems.

The working line port 126*a* may be in optical communication with a first optical link 18*e*, which may be a component of a working path 22*c* of the optical network 10, such that working line port 126*a* may transmit and receive first optical signals on the working path 22*c*. The protection line port 126*b* may be in optical communication with a second optical link 18*f*, which may be a component of a protection path 22*d* of the optical network 10, such that the protection line port 126*b* may transmit and receive second optical signals on the protection path 22*d*. The optical switch 124 may be coupled to the working line port 126*a* to transmit and receive the first optical signals from the working path 22*c* and the protection line port 126*b* to transmit and receive the second optical signals from the protection path 22*d* for selectively switching the optical signals (i.e., the first optical signals or the second optical signals) from the working line port 126*a* and the protection line port 126*b* to the system port 128.

In some implementations, one or more of the controller processors 78 and the module processors 108 may comprise one or more processor working together, or independently, to read and/or execute processor executable code and/or data, such as stored in the controller memories 82 and the module memories 110, respectively. The controller processors 78 and the module processors 108 may be capable of creating, manipulating, retrieving, altering, and/or storing data structures into the controller memories 82 and the module memories 110, respectively. Exemplary implementations of the controller processors 78 and the module processors 108 may include, but are not limited to, a digital signal processor (DSP), a central processing unit (CPU), an FPGA, a microprocessor, a multi-core processor, an application specific integrated circuit (ASIC), a real-time processing unit (RPU), combinations thereof, and/or the like, for example.

The controller processors 78 and the module processors 108 may be further capable of interfacing and/or communicating via the communication network 30, for example, using the controller network switches 86 and the module network switches 112, respectively. For example, the controller processors 78 and the module processors 108 may be capable of communicating via the communication network 30, for example, by exchanging signals (e.g., analog, digital, optical, and/or the like) via one or more interfaces (e.g., the AUX interfaces 98 or the controller interfaces 100) using a network protocol (e.g., TCP/IP) to communicate information.

In some implementations, the controller memories 82 and the module memories 110 may be located in the same physical location as the controller modules 66 and the FRUs 70, respectively, and/or one or more of the controller memories 82 and the module memories 110 may be located remotely from the controller modules 66 and the FRUs 70, respectively. For example, one or more of the controller memories 82 and the module memories 110 may be located remotely from the controller modules 66 and the FRUs 70, respectively, and communicate with the controller processors 78 and the module processors 108, respectively, via the first intra-node communication network 144*a* (shown in FIG. 5A) or the second intra-node communication network 144*b* (shown in FIG. 5A), for example. Additionally, when more than one memory is used for one or more of the controller memories 82 and the module memories 110, a first memory may be located in the same physical location as the controller processors 78 and the module processors 108, and additional memory may be located in a location physically remote from the controller processors 78 and the module processors 108. Additionally, one or more of the controller memories 82 and the module memories 110 may be implemented as a "cloud" non-transitory processor-readable medium (i.e., one or more of the controller memories 82 and the module memories 110 may be partially or completely based on or accessed using the first intra-node communication network 144*a* (shown in FIG. 5A) or the second intra-node communication network 144*b* (shown in FIG. 5A), for example).

Figure 5A:
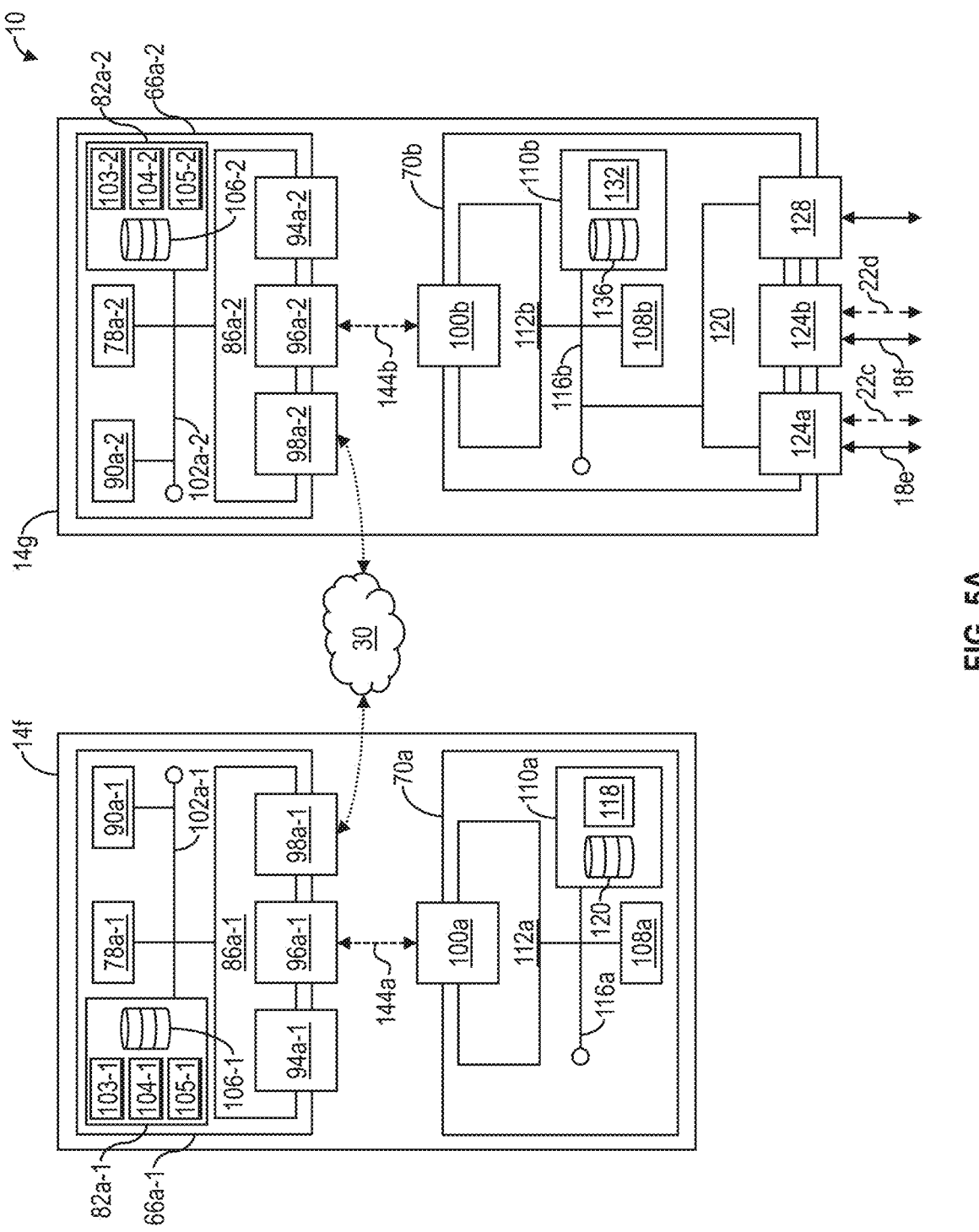
FIG. 5A is a diagrammatic representation of hardware forming an exemplary network comprising a head-end node and a tail-end node constructed in accordance with one implementation of the present disclosure.

Referring now to FIG. 5A, shown therein are a diagrammatic view of an exemplary implementation of the optical network 10 comprising a head-end node 14*f* and a tail-end node 14*g*. Each of the head-end node 14*f* and the tail-end node 14*g* may be an implementation of one of the terminal nodes 14*a*, 14*c* or the transponder nodes 16 shown in FIG. 1. The head-end node 14*f* is shown as comprising a first node controller 66*a*-1 and a line module 70*a*, while the tail-end node 14*g* is shown as comprising a second node controller 66*a*-2 and an OPSM 70*b*. However, one or more of the head-end node 14*f* and the tail-end node 14*g* may further comprise one or more shelf controller 66*b*, as described above. Further, the head-end node 14*f* may further comprise an additional OPSM 70*b* and the tail-end node 14*g* may further comprise an additional line module 70*a*. Finally, while only the head-end node 14*f* and the tail-end node 14*g* are shown, it should be understood that the optical network 10 may further comprise additional nodes 14 not shown in FIG. 5A.

The first node controller 66*a*-1 comprises a first node controller processor 78*a*-1, a first node controller memory 82*a*-1 storing a first communication application 103-1, a first controller application 104-1, a first digital trigger application 105-1, and a first data store 106-1, a first node controller FPGA 90*a*-1, and a first network switch 86*a*-1 comprising a first node controller NCT interface 94*a*-1, a first node controller CM interface 96*a*-1, and a first node controller AUX interface 98*a*-1.

The second node controller 66*a*-2 comprises a second node controller processor 78*a*-2, a second node controller memory 82*a*-2 storing a second communication application 103-2, a second controller application 104-2, second digital trigger application 105-2, and a second data store 106-2, a second node controller FPGA 90*a*-2, and a second network switch 86*a*-2 comprising a second node controller NCT interface 94*a*-2, a second node controller CM interface 96*a*-2, and a second node controller AUX interface 98*a*-2.

Figure 5B:
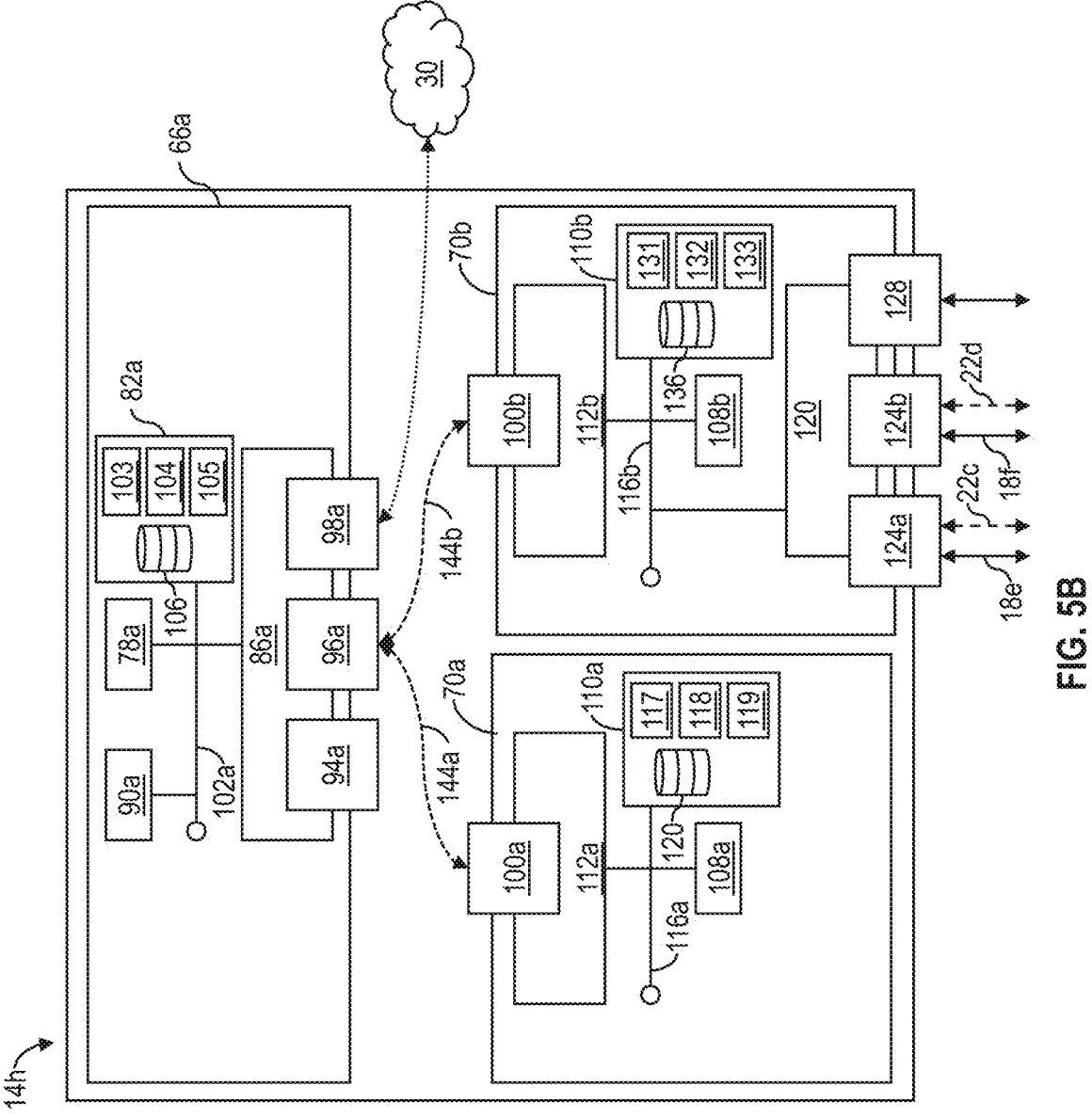
FIG. 5B is a diagrammatic representation of hardware forming an exemplary hybrid node constructed in accordance with one implementation of the present disclosure.

Referring now to FIG. 5B, shown therein are a diagrammatic view of an exemplary implementation of the optical network 10 comprising a hybrid node 14*h* comprising both the line module 70*a* and the OPSM 70*b*. The hybrid node 14*h* may be an implementation of one of the terminal nodes 14*a*, 14*c* or the transponder nodes 16 shown in FIG. 1. While only the hybrid node 14*h* is shown, it should be understood that the optical network 10 may further comprise additional nodes 14 not shown in FIG. 5B.

Figure 6A:
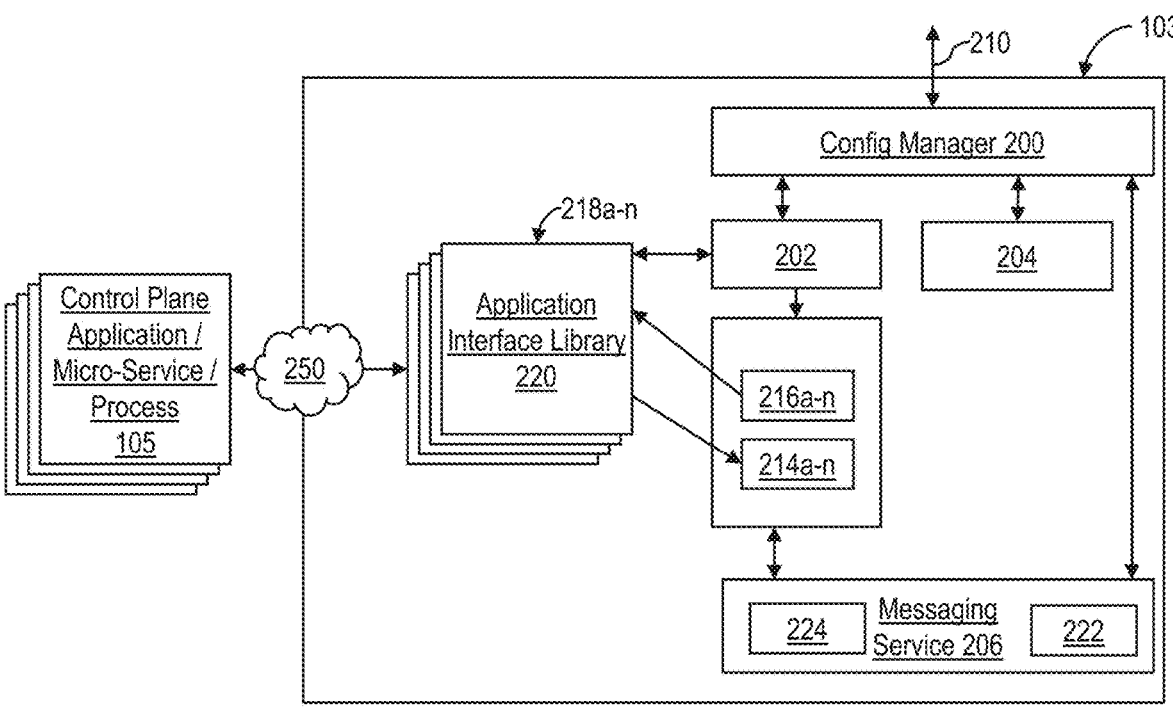
FIG. 6A is a functional view of an exemplary implementation of the head-end node of FIG. 5A implementing a communication application constructed in accordance with the present disclosure.
Figure 6B:
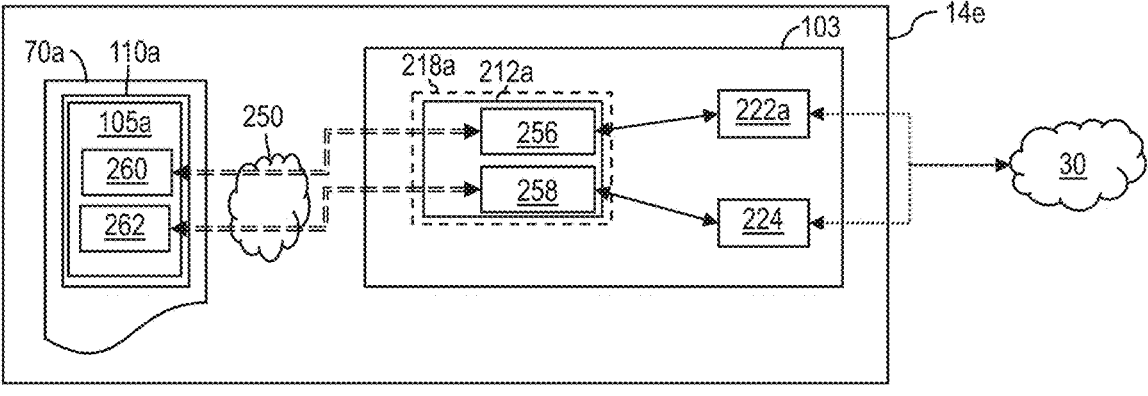
FIG. 6B is an architectural view of an exemplary implementation of the communication application of FIG. 6A constructed in accordance with the present disclosure.

Referring now to FIGS. 6A and 6B, shown therein is a diagrammatic view of an exemplary implementation of the communication application 103 and an exemplary implementation of the head-end node 14*f* having the communication application 103 implementing a messaging intranet 250 constructed in accordance with the present disclosure. To facilitate illustration of the operation of the communication application 103, the communication application 103 and associated elements will be described herein operating using the elements of the exemplary network 10 illustrated in FIG. 5A. It should be noted, however, that communication application 103 may operate similarly using other network elements and/or network setups. For instance, the communication application 103 may operate on a hybrid node such as the hybrid node 14*h* shown in FIG. 5B.

The communication application 103 generally comprises one or more component such as a configuration manager 200, an application coordinator 202, a session manager 204, and a messaging service 206. Each component of the communication application 103 may be implemented as processor-executable instructions stored in the controller memory 82*a* that when executed by the controller processor 78*a* causes the controller processor 78*a* to perform one or more action in accordance with the function/component.

In one implementation, the configuration manager 200 generally handles configuration information coming from a management layer and relays the configuration information to components and updates state information reported by the components to the management layer via a configuration interface 210. In one implementation, the configuration manager 200 receives one or more state information from at least one of: the application coordinator 202 and the session manager 204, and transmits one or more configuration information to one or more of: the application coordinator 202 and the session manager 204.

In one implementation, the application coordinator 202 receives one or more command signal from the configuration manager 200 to register a particular control plane application such as the digital trigger application 105. The controller processor 78*a* executing the application coordinator 202 of the controller application 103, may access an application interface library 220 corresponding to the digital trigger application 105; extract one or more API set definition; and resolve function call bindings. The function call bindings may include, for example, resolving callback functions. In one implementation, resolving the function call bindings may be performed to connect messaging server plugins 216 to a messaging server 224 and to connect messaging client plugins 214 to one or more messaging client 222. In one implementation, each control plane application (such as the digital trigger application 105) may register with the communication application 103 thereby causing the controller processor 78*a* to generate an application plugin 218 associated with that control plane application. In one implementation, the application coordinator 202 further manages each of the control plane applications (such as the digital trigger application 105) as a containerized service, thereby isolating each control plane application from each other.

In one implementation, the application coordinator 202, registering the digital trigger application 105 with the communication application 103, may register the application interface 212 of the digital trigger application 105 with an application interface library 220. In one implementation, each of the messaging client plugins 214 registered in the communication application 103 may be stored as either a static library or dynamic library in the application interface library 220 and may be integrated into the communication application 103 as a separate library such that registration of a second control plane application does not interfere with, and/or require regression of, the previously registered control plane application such as the digital trigger application 105.

In one implementation, the messaging service 206 generally represents a messaging server 224 and one or more messaging clients 222 and abstracts the messaging server 224 and the one or more messaging clients 222 for the one or more other component in the communication application 103. In one implementation, when the messaging service 206 is enabled, the controller processor 78a executing the messaging service 206 instantiates the messaging server 224 and binds the messaging server 224 to a local IP address (e.g., an IP address of the digital node 14e). In one implementation, the messaging server 224 may be multi-threaded, e.g., utilize more than one processing thread when executed by the controller processor 78a; however, in other implementations, the messaging server 224 may be single-threaded.

In one implementation, when a neighbor node (which may be tail-end node 14g) is configured or discovered (as described below), the controller processor 78a may instantiate messaging client 222 operable to communicate, via the network 30, with the tail-end node 14g. In one implementation, the one or more messaging clients 222a-n may be a shared messaging client (e.g., more than one control plane application may access and utilize the shared messaging client) or may be a dedicated/exclusive messaging client (e.g., the dedicated messaging client may only be accessed by a particular control plane application such as the digital trigger application 105). In one implementation, when the controller processor 78a, executing multiples of the control plane application invokes an API corresponding to the shared messaging client 222 to send a message towards the tail-end node 14g, the messages from each of the multiples of the control plane application may be serialized, and, at least in some implementations, may be prioritized, such as on thread priorities when transmitted by the messaging client 222 to a messaging server of the tail-end node 14g.

In one implementation, the controller processor 78a, executing the communication application 103, may implement a query API for a neighbor network node (such as tail-end node 14g) to retrieve a list of API sets and versions supported on the tail-end node 14g. The list of API sets may include, for example, APIs, from the application interface library 220, that are related to one another and the version of each API (e.g., an OpticalTxPowerControl API set, a DigitalTrigger API set, and/or the like). In one implementation, each control plane application may expose one or more API set in the application interface 212. Thus, when the controller processor 78a registers the digital trigger application 105, for instance, with the communication application 103, and registers the application interface 212 of the digital trigger application 105 with the application interface library 220, the list of API sets may include the exposed one or more API set of the digital trigger application 105.

In one implementation, the session manager 204 generally maintains a managed session (e.g., a keep-alive session) with the one or more downstream optical node 14 and may provide one or more status report of the managed session. The session manager 204 may be communicably coupled to the messaging service 206 such that the controller processor 78a, executing the session manager 204, may send and/or receive one or more message via the messaging service 206. In one implementation, the controller processor 78a executing the session manager 204, may implement a managed session process and instantiates the managed session by exchanging a keep-alive (KA) message with a bidirectional streaming API call. Each network node 14 may instantiate the managed session independently after accessing the query API for the neighbor network node. As used herein, a bidirectional stream may include a client stream (e.g., a KA Request, or session request, having one or more request parameters) and a server stream (e.g., a KA Response, or session response, having one or more request parameters). In this way, the controller processor 78a may determine a status of the one or more downstream network node 14 is "DOWN" based on an abnormal session termination.

In one implementation, the controller processor 78a executing the managed session process of the session manager 204 operable to instantiate the managed session with a downstream network node (such as tail-end node 14g), may invoke a StartKASession API (via messaging client 222) and pass the one or more request parameters of the session request. The head-end node 14f may then receive the session response via the messaging client 222 from the messaging server of the tail-end node 14g. In one implementation, the session request is transmitted via the messaging client 222 to the tail-end node 14g at a regular interval, such as 30 seconds, or between about 15-45 seconds. In some implementations, the regular interval may be: a predetermined regular interval, a regular interval supplied by a user (e.g., via a user device or via the computer system 26), or may be a calculated regular interval based on a distance of the tail-end node 14g from the head-end node 14f.

In one implementation, the controller processor 78a may monitor the StartKASession API to determine whether the StartKASession is active or terminated (e.g., closed). The controller processor 78a, executing the session manager 204, may determine that communication with the tail-end node 14g is "DOWN" when the StartKASession is terminated, for example, if the controller processor 78a has not received, via the messaging client 222, a session response from the tail-end node 14g for a predetermined period of time. When the controller processor 78a determines that communication with the tail-end node 14g is "DOWN" the controller processor 78a may try to reinvoke (e.g., invoke again) the StartKASession API with the session request, and may continue to do so while "DOWN" at a retry interval, such as, 120 seconds, or between about 90-150 seconds. In one implementation, the retry interval may change based on a number of retries such that, after a first number of retries, the retry interval is increased and after a second number of retries, the retry interval is increased again. In one implementation, the controller processor 78a, executing the session manager 204, may determine that communication with the tail-end node 14g is "UP" when the StartKASession is active (and, in some implementations, without an error). In this manner, the controller processor 78a may determine whether both the head-end node 14f and the tail-end node 14g are "UP" or "DOWN" at any point in time.

In one implementation, the one or more request parameters of the session request comprises one or more of: a sequence number, a StartKASession API version, the regular interval, a node name of the head-end node 14f, a nodeID of the head-end node 14f, a node type of the head-end node 14f, one or more node capabilities of the head-end node 14f (such as in a capability bitmap), and a node epoch (e.g., a start sequence reset time).

In one implementation, the one or more response parameters of the session response comprises one or more of: a sequence number (of the session request associated with the session response), a StartKASession API version (of the communication application 103 executing on the tail-end node 14g), a response type (e.g., Acknowledge or Not- Acknowledge), a not-acknowledge reason, a node name of the tail-end node 14g, a nodeID of the tail-end node 14g, a node type of the tail-end node 14g, one or more node capabilities of the tail-end node 14g (such as in a capability bitmap), and a node epoch (e.g., a start sequence reset time). Each of the one or more response parameters may have a datatype such as: a signed/unsigned integer, an enum, a string, a HEX string, a HEX value, and/or the like, and may have one or more bitlength such as between 1-bit and 64-bit, for example, however, in some implementations, the bitlength may be longer.

In one implementation, the controller processor 78a may generate one or more mapping between a target IP address of the tail-end node 14g and the node name and/or nodeID of the tail-end node 14g, e.g., in a mapping stored in the controller memory 82a such as in a mapping table. Thus, when the control plane application (such as the digital trigger application 105) refers to a particular downstream network node by either the node name or the nodeID, the controller processor 78a may access the mapping to determine the target IP address of the referenced particular downstream network node. The controller processor 78a, executing the messaging service 206, may then use the target IP address of the referenced particular downstream network node to identify one or more messaging client 222 having the target IP address.

In one implementation, the controller processor 78a executing the session manager 204 may store the session response and/or the one or more response parameters in the controller memory 82a. By storing the session response and the one or more response parameters, the controller processor 78a may detect if the communication application 103a-2 executing on the tail-end node 14g has been restarted, for example, by comparing the sequence reset time response property of a second session response against the sequence reset time response property of a first session response (e.g., that was stored in the controller memory 82a). By detecting that the communication application 103a-2 of the tail-end node 14g has restarted, the controller processor 78a may determine a communication status of the tail-end node 14g.

In one implementation, the controller processor 78a executing the session manager 204 may transmit the communication status of the tail-end node 14g to the configuration manager 200. The controller processor 78a may then cause the state of the tail-end node 14g to be transmitted, e.g., via a configuration interface 210, and/or may update the communication status with one or more control plane application (such as the digital trigger application 105) registered to receive the communication status (as described below).

In one implementation, the controller processor 78a executing the communication application 103 may further instantiate a messaging intranet 250. The messaging intranet 250 may be implemented using well-defined protocols and may be implemented with a network protocol (e.g., TCP/IP stack or UDP stack) to communicate with, for example, control plane applications such as the digital trigger application 105. For example, the messaging intra net 250 may be implemented with an inter-process communication (IPC) framework (i.e., an IPC messaging network) such as a remote procedure call (RPC) framework (i.e., as an RPC messaging network) and/or a specific IPC framework, each providing for and enabling intra-node communications (e.g., sending and/or receiving one or more application message to/from the one or more control plane application). The application interface 212 associated with each of the control plane applications (and stored in the application interface library 220) may communicate with one or more downstream network node (such as tail-end node 14g) via the messaging service 206 or with another control plane application via the messaging intranet 250. In one implementation, the RPC framework may be implemented with gRPC (Google LLC, Mountain View, California). The messaging intranet 250 having the RPC framework may utilize a serialization format for encoding and/or decoding data, such as Protobuf also developed by Google LLC.

The number of devices/components illustrated in FIG. 6A is provided for explanatory purposes. In practice, there may be additional, fewer, different, or differently arranged devices/components than are shown in FIG. 6A. Furthermore, two or more of the devices/components illustrated in FIG. 6A may be implemented within a single device/component, or a single device/component illustrated in FIG. 6A may be implemented as multiple, distributed devices/components. Additionally, one or more of the devices/components illustrated in FIG. 6 may perform one or more component described as being performed by another one or more of the devices/components illustrated in FIG. 6A.

Referring now to FIG. 5B, shown therein is a diagrammatic view of an exemplary implementation of the network node 14 having the communication application 103 implementing the messaging intranet 250 constructed in accordance with the present disclosure. In one implementation, each application interface 212 comprises an interface messaging server 256 and an interface messaging client 258 while each control plane application (such as a first digital trigger application 105a) further comprises an application messaging client 260 and an application messaging server 262. It should be noted that only one application interface 212 (the first application interface 212a) and one control plane application (the first digital trigger application 105a) are shown for simplicity, and, as described above in more detail, the communication application 103 may include more than one application interface 212 and more than one control plane application.

In one implementation, the data store 106 may store information (e.g., configuration information or other operational data) received from, for example, the one or more control plane applications such as the digital trigger application 105. Further, in some implementations, for example if the communication application 103 and the control plane applications such as the digital trigger application 105 are in the same process, the data store 106 may include one or more messaging server (e.g., the interface messaging server 256) to which the one or more control plane application such as the digital trigger application 105 may send a request having one or more request property and information (e.g., state management information, configuration information, operational information, streaming information, and/or notification semantics) and one or more messaging client (e.g., the interface messaging client 258) from which the one or more control plane application may send the request and receive a response. In this way, the data store 106 may serve as an inter-process communication (IPC) framework for communication between the control plane applications (such as the digital trigger application 105) and the application interfaces 212.

In one implementation, the messaging intranet 250 may be implemented as a remote procedure call (RPC) framework to enable communication (e.g., sending and/or receiving one or more message) between each control plane application (such as digital trigger application 105) and the application interface 212. In one implementation, the messaging intranet 250 may be independent from the network 30, that is, the messaging intranet 250 may have a different domain (i.e., IP/network domain) than the network 30; however, in some implementations, IDL definitions can be used across domains (e.g., across network domains) to avoid copying parameters between the messaging intranet 250 and the network 30.

In one implementation, the digital trigger application 105 may invoke a particular API defined in the application interface library 220 by sending a request having one or more request parameter, such as a node name or nodeID, via the application messaging client 260 to the interface messaging server 256. For instance, when the line module 70a receives notification of a fault, the digital trigger application 105 may send a fault trigger request including request parameters such as a sequence number, a sequence reset time, and a nodeID of the OPSM 70b and fault information regarding the fault. The first application interface 212a, having received the request via the interface messaging server 256, may in-turn invoke the API towards the tail-end node 14g utilizing the associated messaging client 222 as determined by the messaging service 206 (e.g., via the mapping as described above). In one implementation, a response having the one or more response parameters may be received by the messaging server 224 and directed from the messaging service 206 to the associated interface messaging server 256 as based on the mappings as described above. The interface messaging server 256 may then provide the response having the one or more response parameters to the application messaging client 260 that originated the request.

In one implementation, the messaging server 224 of the messaging service 206 receives a request (e.g., an API call) from the tail-end node 14g and invokes a callback function based on the one or more request property of the received request. The callback function may be registered to the application interface 212 in the application interface library 220. Thus, invoking the callback function may cause the application interface 212 (e.g., the first application interface 212a) to call the API defined in the first digital trigger application 105a by sending a message from the interface messaging client 258 to the application messaging server 262 via the messaging intranet 250. A response received by the application interface 212 from the first digital trigger application 105a may be sent back to the messaging server 224 of the messaging service 206, which, in turn, sends the response back to the tail-end node 14g that sent the request.

In one implementation, the messaging intranet 250 may be implemented as a specific IPC framework to enable communication (e.g., sending and/or receiving one or more message) between each control plane application such as the digital trigger application 105a and the application interface 212a. In one implementation, the messaging intranet 250 may be independent from the network 30, that is, the messaging intranet 250 may have a different domain (i.e., IP/network domain) than the network 30. Because the messaging intranet 250 and the network 30 utilize differing frameworks, the controller processor 78a executing the application interface 212 may convert messages passing between the network 30 and the messaging intranet 250 (and, for example, IDL definitions) from a first encoding format associated with a first framework to a second encoding format associated with a second framework, e.g., from an encoding format associated with the specific IPC framework (e.g., an IPC encoding format) to the Protobuf encoding format of the RPC framework, and vice-versa. In one implementation, the controller processor 78a may store, e.g., in the controller memory 82a, a mapping to map between the encoding associated with the specific IPC framework and the Protobuf encoding of the RPC framework.

In this implementation, the first digital trigger application 105a may send an operation and one or more request parameter from the application messaging client 260 (i.e., an IPC messaging client) to the interface messaging server 256 (i.e., an IPC messaging server) via the messaging intranet 250. The controller processor 78a executing the application interface 212 may then invoke an API associated with the operation, thereby e.g., by invoking the API towards the downstream network node (the tail-end node 14g) utilizing the associated messaging client 222 as determined by the messaging service 206 (e.g., via the mapping as described above and based on the one or more request parameter). In one implementation, a response having the one or more response parameters may be received by the messaging server 224 and directed from the messaging service 206 to the associated interface messaging server 256 as based on the mappings as described above. The controller processor 78a executing the application interface 212 may then convert the response having the one or more response parameters from Protobuf encoding to the encoding associated with the specific IPC framework and transmit the converted response having the one or more response parameters from the interface messaging server 256 to the application messaging client 260 that originated the request via the messaging intranet 250.

In one implementation, the messaging server 224 of the messaging service 206 receives a request (e.g., an API call) from the tail-end node 14g and invokes a callback function based on the one or more request property of the received request. The callback function may be registered to the first application interface 212a in the application interface library 220. The first application interface 212a may convert the request having the one or more request parameters from Protobuf encoding to the encoding associated with the specific IPC framework. Thus, invoking the callback function may cause the application interface 212 (e.g., the first application interface 212a) to call the API defined in the digital trigger application 105a by sending the converted request from the interface messaging client 258 to the application messaging server 262 via the messaging intranet 250. A response received by the application interface 212 from the first digital trigger application 105a may be converted from the encoding associated with the specific IPC framework to the Protobuf encoding and may be sent back to the messaging server 214 of the messaging service 206, which, in turn, sends the response back to the tail-end node 14g that sent the request.

The number of devices/components illustrated in FIG. 6B are provided for explanatory purposes. In practice, there may be additional, fewer, different, or differently arranged devices/components than are shown in FIG. 6B. Furthermore, two or more of the devices/components illustrated in FIG. 6B may be implemented within a single device/component, or a single device/component illustrated in FIG. 6B may be implemented as multiple, distributed devices/components. Additionally, one or more of the devices/components illustrated in FIG. 6B may perform one or more function described as being performed by another one or more of the devices/components illustrated in FIG. 6B.

Figures 7A, 7B:
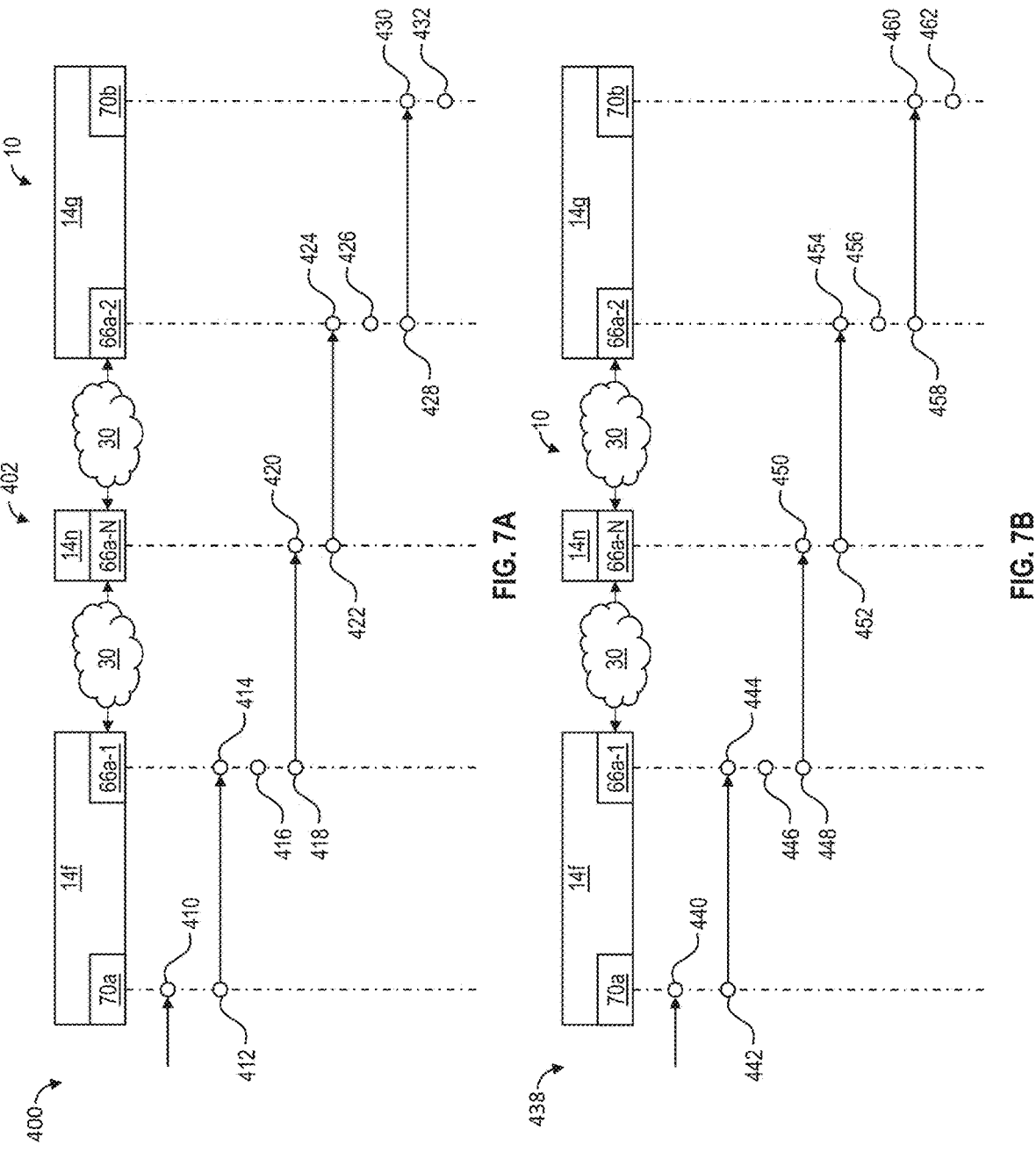
FIG. 7A is an exemplary process diagram of how a fault packet is created, forwarded, and processed using a "fast path" formed in the network of FIG. 5A in accordance with one implementation of the present disclosure.
FIG. 7B is an exemplary process diagram of how a fault trigger request is created, forwarded, and processed using a "slow path" formed in the network of FIG. 5A in accordance with one implementation of the present disclosure.

Referring now to FIG. 7A, shown therein is an exemplary process 400 illustrated in diagrammatic form showing how a fault packet is generated, forwarded, and processed using a hardware-assisted "fast path" 402 (which may be referred to herein as fast path 402). The process 400 and the fast path 402 will be described herein using the elements of the exemplary network 10 illustrated in FIG. 5A. It should be noted, however, that the fast path 402 may be formed using other network elements.

The fast path 402 extends from the line module 70*a* to the optical protection switching module 70*b* across the network 10. The fast path 402 is referred to as a "fast path" because packets sent across the fast path 402 are handled using the systems and methods for Hardware-Assisted Digital Fault Relay for Sub-50 ms Optical Protection described in U.S. patent application Ser. No. 18/461,259. the contents of which are hereby incorporated by reference in their entirety. The fast path 402 utilizes hardware elements such as the packet forwarding circuitry 90*a*-1 of the first node controller 66*a*-1 of the head-end node 14*f* and the packet forwarding circuitry 90*a*-2 of the second node controller 66*a*-2 of the tail-end node 14*g* to forward packets through the network 10 from the source module (line module 70*a* in this illustrative embodiment) to a destination module (optical protection switching module 70*b* in this illustrative embodiment) without using software based forwarding techniques (such as a software based "slow path" that will be described with reference to FIG. 6B) that are typically used in these types of inter-domain packet forwarding scenarios.

A plurality of flow identifiers (Flow IDs) may be allocated to facilitate communication between network elements along the fast path 402. For instance, the Flow IDs may be used by the packet forwarding circuitry 90*a*-1 of the first node controller 66*a*-1 of the head-end node 14*f* and the packet forwarding circuitry 90*a*-2 of the second node controller 66*a*-2 of the tail-end node 14*g* to identify a particular portion of the fast path 402 to update a packet header of a fault packet as described in U.S. patent application Ser. No. 18/461,259. In some implementations, the Flow IDs are 8 bits (i.e., 1 byte) in length. In other implementations, the Flow IDs are 16 bits (i.e., 2 bytes) in length. However, it should be understood that the Flow IDs may have a length other than 8 or 16 bits. The fast path 402 may utilize different communication networks for the transmission of fault packets. For example, the fast path 402 may utilize the communication network 30 shown in FIG. 1. Further, the fast path 402 may utilize the first intra-node communication network 144*a* and the second intra-node communication network 144*b*, respectively. In some implementations, the first intra-node communication network 144*a*, the communication network 30, and the second intra-node communication network 144*b* are a first virtual local area network (VLAN), a second VLAN, and a third VLAN, respectively. In such implementations, each of the VLANs may have a unique VLAN identifier. In some implementations, the first intra-node communication network 144*a* is a Layer 2 communication network. In other implementations, the first intra-node communication network 144*a* is a Layer 3 communication network. In some implementations, the second intra-node communication network 144*b* is a Layer 2 communication network.

In step 410, the line module 70*a* receives fault information which may also be referred to as a fault trigger.

In step 412, the line module 70*a* generates a fault packet and sends the fault packet from the line module 70*a* to the first node controller 66*a*-1. The fault packet includes a packet header and the fault information. The packet header includes a sequence number and a sequence reset time encoded into the header by the processor 108*a* of the line module 70*a*.

The sequence number may be a positive integer that is incremented sequentially up from zero (0) (which may be referred to as a minimum integer) to a maximum integer (which may be a four-byte integer, for instance) as new fault packets are generated. The line module 70*a* may store a last used sequence number in the database 120 in the non-transitory processor-readable medium 110*a*. When the sequence number reaches the maximum integer, the processor 108*a* may be programmed to cause the sequence number to reset or roll over to zero (0) when the next fault packet is generated. The sequence number may also be reset to zero (0) in other scenarios such as when the line module 70*a* reboots, the network controller 66*a*-1 reboots, or there is a reconfiguration of the line module 70*a*, for instance. Using the above reset or roll over mechanism, the fault packet or trigger with a lower sequence number may be accepted as a non-duplicate fault packet or trigger for protection switching as will be described in further detail below.

The sequence reset time may be a timestamp of when the sequence number was last reset as described above, for instance.

It should be noted that the fault packet may include other information such as packet forwarding information as described in U.S. patent application Ser. No. 18/461,259.

In step 414, the fault packet is received at the switch 86*a*-1 and forwarded to the packet forwarding circuitry 90*a*-1.

In step 416, the packet forwarding circuitry 90*a*-1 automatically forwards the fault packet back to the switch 86*a*-1.

In step 418, the fault packet is forwarded through the switch 86*a*-1 and over the network 30.

In optional steps 420 and 422, the fault packet is received at and automatically forwarded through the node controller 66*a*-N of n number of nodes 14*n*. Steps 420 and 422 are noted as optional because the network 10 may not have any nodes 14*n* situated between the head-end node 14*f* and the tail-end node 14*g*.

In step 424, the fault packet is received at the switch 86*a*-2 of the second node controller 66*a*-2 of the tail-end node 14*g* and forwarded to the packet forwarding circuitry 90*a*-2.

In step 426, the packet forwarding circuitry 90*a*-2 automatically forwards the fault packet back to the switch 86*a*-2.

In step 428, the fault packet is forwarded through the switch 86*a*-2 to the optical protection switching module 70*b*.

In step 430, the optical protection switching module 70*b* receives the fault packet and forwards the fault packet to the processor 108*b*. In some embodiments, the fault packet is received at the switch 112*b*.

In step 432, the processor 108*b* processes the fault packet, and, if the optical protection switching module 70*b* determines the fault information contained in the fault packet is new fault information, that is fault information the optical protection switching module 70*b* has not previously received and acted on, the processor 108*b* causes the optical protection switching module 70*b* to perform protection switching such as by switching the first line port 124*a* or the second line port 124*b* to the system port 128 on the optical switch 120 based on the fault information. If the optical protection switching module 70*b* determines that the fault information contained in the fault packet is not new (or stale), the processor 108*b* causes the optical protection switching module 70*b* to discard the fault packet.

The optical protection switching module 70*b* determines if the fault information contained in the fault packet is new fault information by comparing the sequence number and the sequence reset time in the packet header to a stored sequence number and a stored sequence reset time stored in the non-transitory processor-readable medium 110*b*. If the sequence number in the packet header is greater than the stored sequence number and the sequence reset time in the packet header is equal to the stored sequence reset time, the fault information is determined to be new fault information. If the fault information is determined to be new fault information, the processor 108*b* may be programmed to replace the stored sequence number with the sequence number in the packet header and the stored sequence reset time with the sequence reset time in the packet header. In some embodiments, the stored sequence number and the stored sequence reset time may be stored in the database 136 in the non-transitory processor-readable medium 110*b*.

It should be noted that in some implementations, a fast path may be formed in a hybrid node such as the hybrid node 14*h* shown in FIG. 5B. In such an implementation, the fast path may be formed between the line module 70*a* and the OPSM 70*b* of the hybrid node 14*h*. In some implementations, the fast path utilizes the first intra-node communication network 144*a* and the second intra-node communication network 144*b*.

Referring now to FIG. 7B, shown therein is an exemplary process 438 illustrated in diagrammatic form showing how a fault packet is generated, forwarded, and processed using a software-based "slow path" 439 (which may be referred to herein as slow path 439). The process 438 and the slow path 439 will be described herein using the elements of the exemplary network 10 illustrated in FIG. 5A. It should be noted, however, that the slow path 439 may be formed using other network elements.

The slow path and/or packet creation and handling on the slow path may be done using the systems and methods for API Based Inter-Node Control Plane Communication Infra-structure described in U.S. patent application Ser. No. 18/461,058, the contents of which are hereby incorporated by reference in their entirety.

It should be understood that the INCI is an API-based framework (such as the communication application 103) that interfaces with applications such as the Digital Trigger Application 105 (designed to run over INCI). The Digital Trigger Application 105 supports a) processing of user configuration and setup of initial handshake between the head-end node 14*f* and elements of the tail-end node 14*g*, b) exchange of capabilities and setup of a FlowID which is a unique number used to identify and switch packets in the fast path to a desired destination, c) setting up fast path hardware (such as the packet forwarding circuitry 90*a*-1 and packet forwarding circuitry 90*a*-2) with the above information, d) exchange of slow path fault triggers from the first node controller 66*a*-1 of the head-end node 14*f* to the second node controller 66*a*-2 of the tail-end node 14*g*, e) forwarding the fault triggers from the line module 70*a* to the optical protection switching module 70*b*, and f) alarming on the slow path.

In step 440, the line module 70*a* receives fault information.

In step 442, a first digital trigger application 105*a* of the line module 70*a* generates a fault trigger request and sends the fault trigger request from the line module 70*a* to the first node controller 66*a*-1. The fault trigger request includes request parameters and the fault information. The request parameters include a sequence number and a sequence reset time encoded by the processor 108*a* of the line module 70*a* as described above.

It should be noted that the fault trigger request may include other information such as described in U.S. patent application Ser. No. 18/461,058.

In step 444, the fault trigger request is received at the switch 86*a*-1 and forwarded to the processor 78*a*-1 for processing.

In step 446, the processor 78*a*-1 processes the fault trigger request and forwards the fault packet back to the switch 86*a*-1. In some implementations, the fault trigger request may be processed using the communication application 103 and digital trigger application 105 as described above. In some implementations, processing the fault packet may be done as described in U.S. patent application Ser. No. 18/461, 058.

In step 448, the fault trigger request is forwarded through the switch 86*a*-1 and over the network 30.

In optional steps 450 and 452, the fault trigger request is received at and forwarded through the node controller 66*a*-N of n number of nodes 14*n*. Steps 450 and 452 are noted as optional because the network 10 may not have any nodes 14*n* situated between the head-end node 14*f* and the tail-end node 14*g*.

In step 454, the fault trigger request is received at the switch 86*a*-2 of the second node controller 66*a*-2 of the tail-end node 14*g* and forwarded to the processor 78*a*-2.

In step 456, the processor 78*a*-2 processes the fault trigger request and forwards the fault trigger request back to the switch 86*a*-2. Processing the fault trigger request may be done as described in U.S. patent application Ser. No. 18/461, 058.

In step 458, the fault trigger request is forwarded through the switch 86*a*-2 to the optical protection switching module 70*b*.

In step 460, the optical protection switching module 70*b* receives the fault trigger request and forwards the fault trigger request to the processor 108*b*. In some embodiments, the fault trigger request is received at the switch 112*b*.

In step 462, the processor 108*b* processes the fault trigger request, and, if the optical protection switching module 70*b* determines the fault information contained in the fault packet is new fault information, that is fault information the optical protection switching module 70*b* has not previously received and acted on, the processor 108*b* causes the optical protection switching module 70*b* to perform protection switching such as by switching the first line port 124*a* or the second line port 124*b* to the system port 128 on the optical switch 120 based on the fault information. If the optical protection switching module 70*b* determines that the fault information contained in the fault trigger request is not new (or stale), the processor 108*b* causes the optical protection switching module 70*b* to discard the fault trigger request.

The optical protection switching module 70*b* determines if the fault information contained in the fault trigger request is new fault information by comparing the sequence number and the sequence reset time in the request parameters to a stored sequence number and a stored sequence reset time stored in the non-transitory processor-readable medium 110*b*. If the sequence number in the request parameters is greater than the stored sequence number and the sequence reset time in the request parameters is equal to the stored sequence reset time, the fault information is determined to be new fault information. If the fault information is determined to be new fault information, the processor 108*b* may be programmed to replace the stored sequence number with the sequence number in the request parameters and the stored sequence reset time with the sequence reset time in the request parameters. In some embodiments, the stored sequence number and the stored sequence reset time may be stored in the database 136 in the non-transitory processor-readable medium 110*b*.

Figure 8:
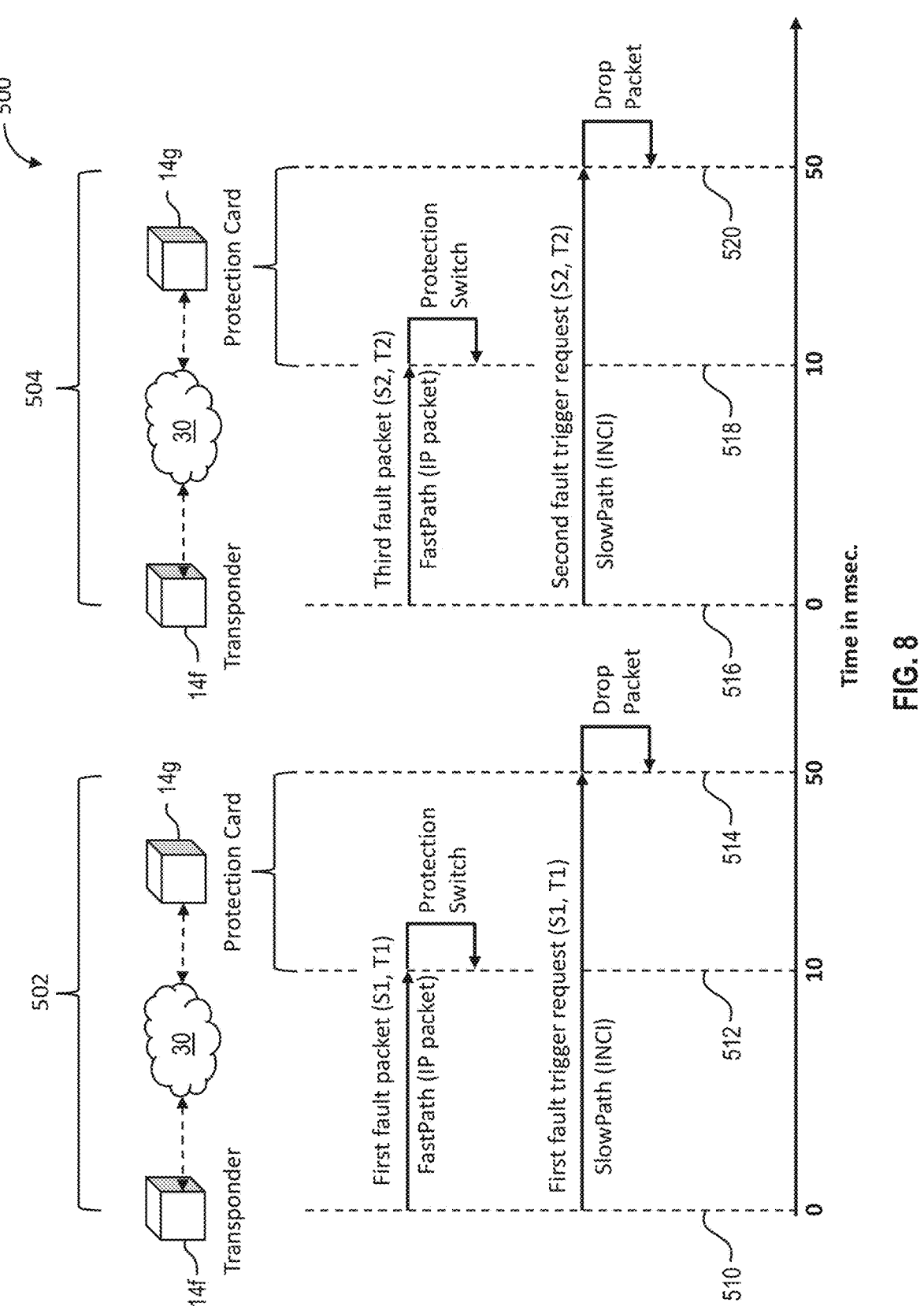
FIG. 8 is an exemplary process diagram illustrating how a first fault packet sent via the fast path of FIG. 6A and a first fault trigger request sent via the slow path of FIG. 6B, containing the same fault information but received at different times by an optical protection switching module, are processed by the optical protection switching module to ensure that the fault information is only acted on once in accordance with one implementation of the present disclosure.

Referring now to FIG. 8, shown therein is an exemplary process 500 illustrated in diagrammatic form. The process 500 will be described herein using the elements of the exemplary network 10 illustrated in FIG. 5A, the fast path 402 illustrated in FIG. 6A, and the slow path illustrated in FIG. 6B. It should be noted, however, that the process 500 may be performed on a network formed using other network elements.

The process 500 illustrates how a first fault packet and a first fault trigger request, that are generated and sent substantially simultaneously by the line card 70*a*, containing the same fault information but received at different times by the optical protection switching module 70*b*, are processed by the optical protection switching module 70*b* to ensure that the fault information is only acted on once to avoid unwanted protection switching. To help illustrate the process 500, steps of the process 500 are shown on a timeline. It should be noted, however, that the times shown in FIG. 7 are for the purposes of illustration only and should not be considered limiting unless otherwise noted.

To further illustrate the concepts disclosed herein, the process 500 includes a first fault protection sequence 502 and a second fault protection sequence 504.

In step 510, at a time of zero (0) milliseconds in the first fault protection sequence 502 the line card 70*a* of the head-end node 14*f* substantially simultaneously sends the first fault packet via the fast path 402 and the first fault trigger request via the slow path 439 towards the optical protection switching module 70*b* of the tail-end optical node 14*g*. The first fault packet comprises a first packet header and fault information. The first packet header includes a first sequence number (S1) and a first sequence reset time (T1) encoded into the first packet header by the processor 108*a* of the line module 70*a*. The first fault trigger request comprises first request parameters and the fault information, the first request parameters including the first sequence number (S1) and the first sequence reset time (T1) encoded by the processor 108*a* of the line module 70*a*.

In step 512, at a time of ten (10) milliseconds or less in the first fault protection sequence 502, the optical protection switching module 70*b* of the tail-end optical node 14*g* receives the first fault packet and processes the first fault packet to determine if the fault information contained in the first fault packet is new fault information. The optical protection switching module 70*b* determines if the fault information contained in the first fault packet is new fault information by comparing the first sequence number and the first sequence reset time in the first packet header to a stored sequence number and a stored sequence reset time stored in the non-transitory processor-readable medium 110*b* of the optical protection switching module 70*b*. In the illustrated embodiment, the optical protection switching module 70*b* determined that the first sequence number in the first packet header was greater than the stored sequence number and the first sequence reset time in the first packet header was equal to the stored sequence reset time so the processor 108*b* replaced the stored sequence number with the first sequence number and the stored sequence reset time with the first sequence reset time and performed a protection switch. In other words, the stored sequence number is now equal to the first sequence number and the stored sequence rest time is now equal to the first sequence reset time.

In step 514, at a time of fifty (50) milliseconds in the first fault protection sequence 502, the optical protection switching module 70*b* of the tail-end optical node 14*g* receives the first fault trigger request and processes the first fault trigger request to determine if the fault information contained in the first fault trigger request is new fault information. The optical protection switching module 70*b* determines if the fault information contained in the first fault trigger request is new fault information by comparing the first sequence number and the first sequence reset time in the first request parameters to the stored sequence number (now equal to the first sequence number) and the stored sequence reset time (now equal to the first sequence reset time) stored in the non-transitory processor-readable medium 110*b* of the optical protection switching module 70*b*. In the illustrated embodiment, the optical protection switching module 70*b* determined that the first sequence number in the first request parameters was equal to the stored sequence number and the first sequence reset time in the first request parameters was equal to the stored sequence reset time so the processor 108*b* caused the optical protection switching module 70*b* to discard the first fault trigger request. In other words, the optical protection switching module 70*b* determined that the fault information in the first fault trigger request was stale and should not be processed or acted upon to avoid unwanted protection switching.

In step 516, at a time of zero (0) milliseconds in the second fault protection sequence 504, the line card 70*a* of the head-end node 14*f* substantially simultaneously sends a second fault packet via the fast path 402 and a second fault trigger request via the slow path 439 towards the optical protection switching module 70*b* of the tail-end optical node 14*g*. The second fault packet comprises a second packet header and second fault information. The second packet header includes a second sequence number (S2) and a second sequence reset time (T2) encoded into the second packet header by the processor 108*a* of the line module 70*a*. The second fault trigger request comprises second request parameters and the second fault information, the second request parameters including the second sequence number (S2) and the second sequence reset time (T2) encoded into the second request parameters by the processor 108*a* of the line module 70*a*.

In step 518, at a time of ten (10) milliseconds or less in the second fault protection sequence 504, the optical protection switching module 70*b* of the tail-end optical node 14*g* receives the second fault packet and processes the second fault packet to determine if the second fault information contained in the second fault packet is new fault information. The optical protection switching module 70*b* determines if the second fault information contained in the second fault packet is new fault information by comparing the second sequence number and the second sequence reset time in the second packet header to the stored sequence number (now equal to the first sequence reset time) and the stored sequence reset time (now equal to the first sequence reset time) stored in the non-transitory processor-readable medium 110*b* of the optical protection switching module 70*b*. In the illustrated embodiment, the optical protection switching module 70*b* determined that the second sequence number in the second packet header was greater than the stored sequence number and the second sequence reset time in the second packet header was equal to the stored sequence reset time so the processor 108*b* replaced the stored sequence number with the second sequence number and the stored sequence reset time with the second sequence reset time and performed a protection switch.

In step 520, at a time of fifty (50) milliseconds in the second fault protection sequence 504, the optical protection switching module 70*b* of the tail-end optical node 14*g* receives the second fault trigger request and processes the second fault trigger request to determine if the second fault information contained in the second fault trigger request is new fault information. The optical protection switching module 70*b* determines if the second fault information contained in the second fault trigger request is new fault information by comparing the second sequence number and the second sequence reset time in the second request parameters to the stored sequence number (now equal to the second sequence number) and the stored sequence reset time (now equal to the second sequence reset time) stored in the non-transitory processor-readable medium 110*b* of the optical protection switching module 70*b*. In the illustrated embodiment, the optical protection switching module 70*b* determined that the second sequence number in the second request parameters was equal to the stored sequence number and the second sequence reset time in the second request parameters was equal to the stored sequence reset time so the processor 108*b* caused the optical protection switching module 70*b* to discard the second fault trigger request. In other words, the optical protection switching module 70*b* determined that the second fault information in the second fault trigger request was stale and should not be processed or acted upon to avoid unwanted protection switching.

Figure 9:
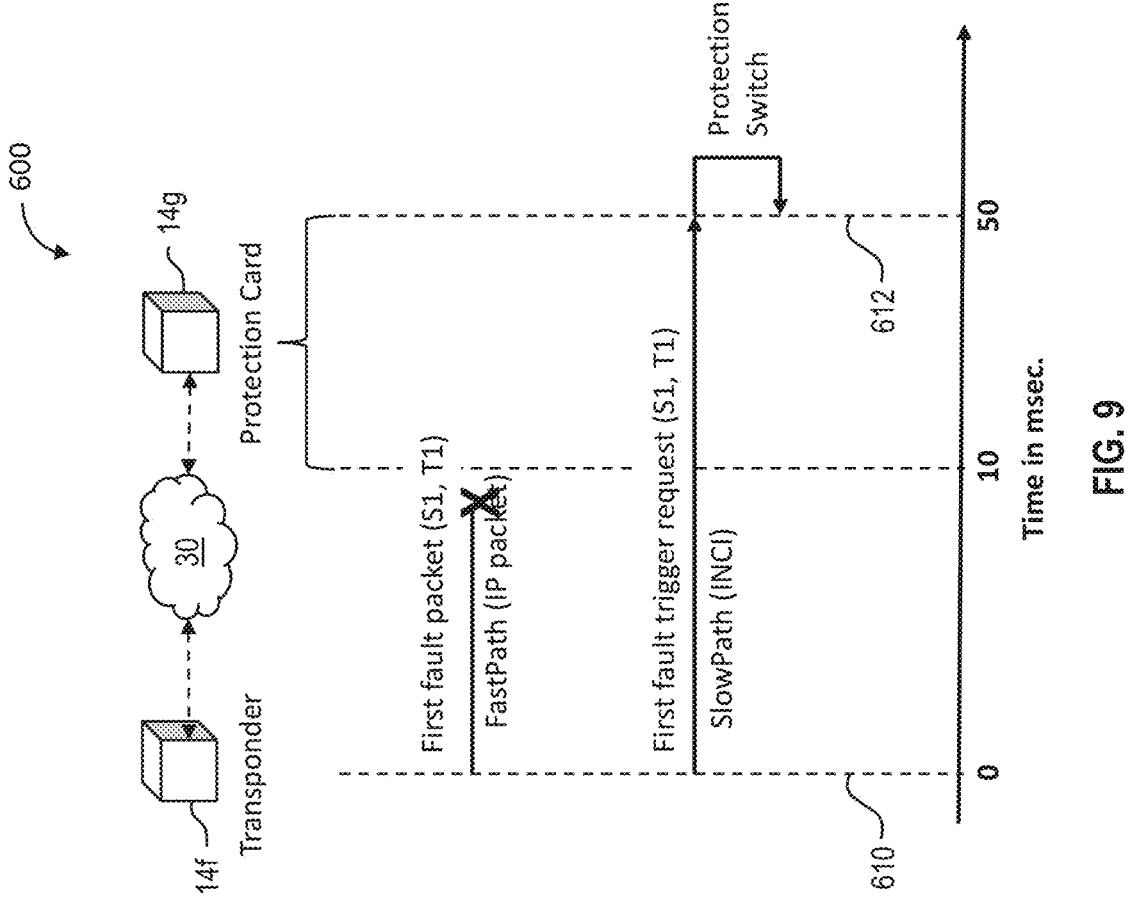
FIG. 9 is an exemplary process diagram of a hypothetical use case in which a first fault packet sent via the fast path of FIG. 6A is not received by an optical protection switching module but a first fault trigger request sent via the slow path of FIG. 6B is received and processed by the optical protection switching module in accordance with one implementation of the present disclosure.

Referring now to FIG. 9, shown therein is an exemplary process 600 illustrated in diagrammatic form. The process 600 will be described herein using the elements of the exemplary network 10 illustrated in FIG. 5A, the fast path 402 illustrated in FIG. 6A, and the slow path illustrated in FIG. 6B. It should be noted, however, that the process 600 may be performed on a network formed using other network elements.

The process 600 illustrates how a broken network path (such as the fast path 402) would be handled according to the concepts disclosed herein. To help illustrate the process 600, steps of the process 600 are shown on a timeline.

In step 610, at a time of zero (0) milliseconds the line card 70*a* of the head-end node 14*f* substantially simultaneously sends a first fault packet via the fast path 402 and a first fault trigger request via the slow path 439 towards the optical protection switching module 70*b* of the tail-end optical node 14*g*. The first fault packet comprises a first packet header and fault information. The first packet header includes a first sequence number (S1) and a first sequence reset time (T1) encoded into the first packet header by the processor 108*a* of the line module 70*a*. The first fault trigger request comprises first request parameters and the fault information. The first request parameters include the first sequence number (S1) and the first sequence reset time (T1) encoded into the first request parameters by the processor 108*a* of the line module 70*a*.

As illustrated by the X at the end of the line indicating a progress of the first fault packet between the line module 70*a* of the head-end node 14*f* and the optical protection switching module 70*b* of the tail-end optical node 14*g*, the fast path 402 was broken and the first fault packet was lost. Exemplary reasons that the fast path 402 may be broken include, but are not limited to, network 30 issues, resetting of one or more controllers and/or modules such as the first node controller 66*a*-1, the second node controller 66*a*-2, or the optical protection switching module 70*b* while the first fault packet was in route, or resetting of one of the nodes 14*g* or 14*f*. The fast path 402 is set up as a one-way path that does not allow for receipt notices for sent packets so when a packet is lost, such as the first fault packet in the illustrated scenario in FIG. 9, the line network 10 does not know to re-send the lost packet.

The slow path 439, on the other hand, does allow for receipt notices for sent packets and so the slow path 439 can recover if the slow path 439 is broken in one or more of the ways described above. As a result, the protective switching might be delayed, but will be executed when the resetting module, controller, or node comes back up.

In step 612, at a time of fifty (50) milliseconds, the optical protection switching module 70*b* of the tail-end optical node 14*g* receives the first fault trigger request and processes the first fault trigger request to determine if the fault information contained in the first fault trigger request is new fault information. The optical protection switching module 70*b* determines if the fault information contained in the first fault trigger request is new fault information by comparing the first sequence number and the first sequence reset time in the first request parameters to a stored sequence number and a stored sequence reset time stored in the non-transitory processor-readable medium 110*b* of the optical protection switching module 70*b*. In the illustrated embodiment, because the first fault packet was lost during transmission and did not reach the optical protection switching module 70*b*, the optical protection switching module 70*b* determined that the first sequence number in the first request parameters was greater than the stored sequence number and the first sequence reset time in the first request parameters was equal to the stored sequence reset time so the processor 108*b* replaced the stored sequence number with the first sequence number and the stored sequence reset time with the first sequence reset time and performed a protection switch based on the fault information in the first fault trigger request.

Figure 10:
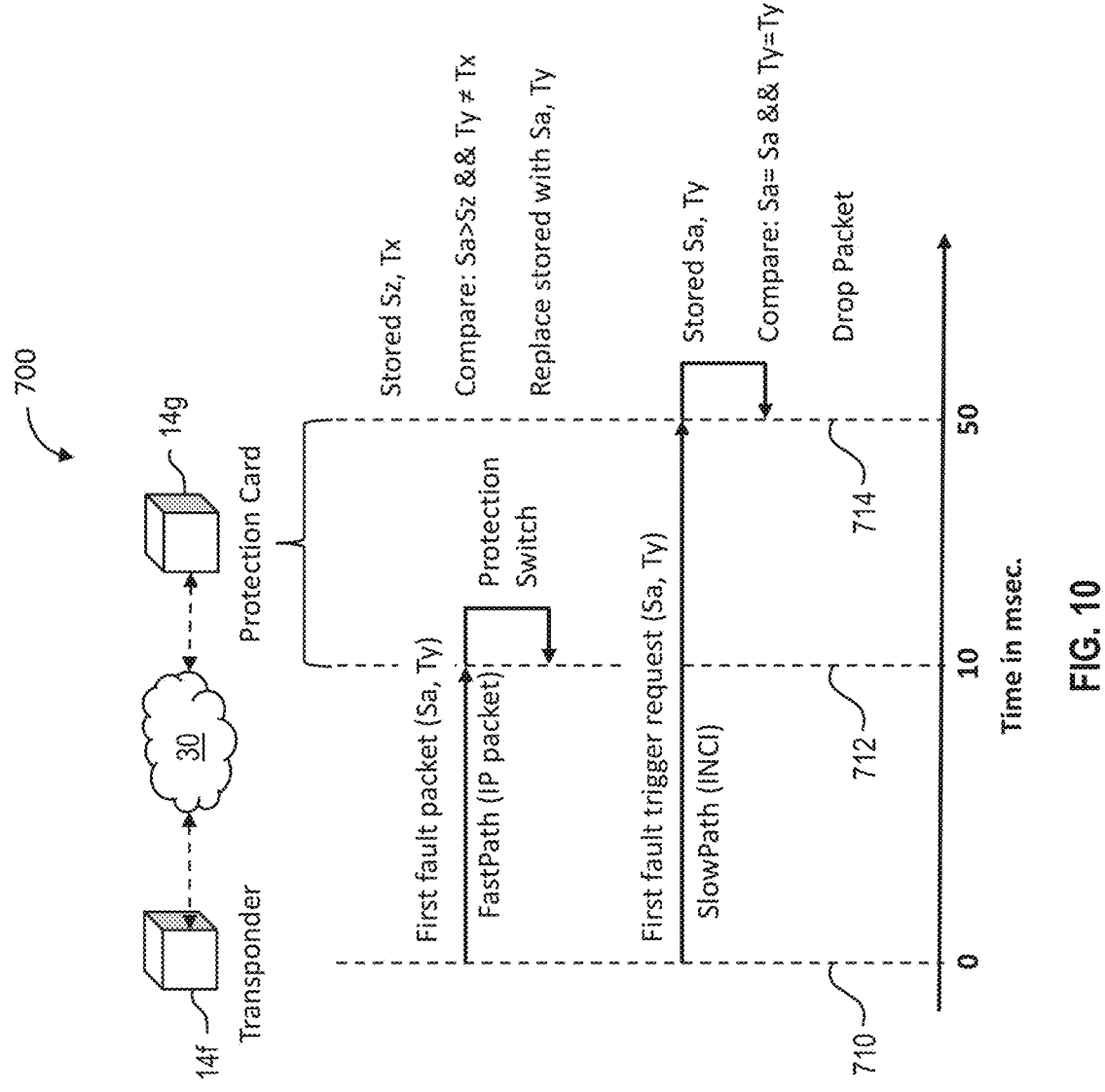
FIG. 10 is an exemplary process diagram of a sequence number roll-over process performed by a line module and an optical protection switching module in accordance with one implementation of the present disclosure.

Referring now to FIG. 10, shown therein is an exemplary process 700. The process 700 will be described herein using the elements of the exemplary network 10 illustrated in FIG. 5A, the fast path 402 illustrated in FIG. 6A, and the slow path illustrated in FIG. 6B. It should be noted, however, that the process 700 may be performed on a network formed using other network elements.

The process 700 is a sequence number roll-over process performed by the line module 70*a* and the optical protection switching module 70*b* to reset the sequence number to zero (0) after the sequence number has reached the maximum integer. For the sake of illustration, the sequence number will be described with a minimum integer of Sa and a maximum integer of Sz.

In some implementations, the line module 70*a* may store a last used sequence number in the database 120 in the non-transitory processor-readable medium 110*a*. When the last sequence number used and stored in the database 120 reaches the maximum integer, the processor 108*a* may be programmed to cause the sequence number to reset to zero (0) when the next fault packet is generated. The sequence number may also be reset to the minimum integer in other scenarios such as when the line module 70*a* reboots, the network controller 66*a*-1 reboots, or there is a reconfiguration of the line module 70*a*, for instance. When the sequence number is reset to zero, a sequence reset time store in the database 120 may also be "reset" or changed to a timestamp of when the sequence number was last reset to zero.

In step 710, at a time of zero (0) milliseconds the line card 70*a* of the head-end node 14*f* substantially simultaneously sends a first fault packet via the fast path 402 and a first fault trigger request via the slow path 439 towards the optical protection switching module 70*b* of the tail-end optical node 14*g*. The first fault packet comprises a first packet header and fault information. The first packet header includes a first sequence number (Sa) and a first sequence reset time (Ty) encoded into the first packet header by the processor 108*a* of the line module 70*a*. The first fault trigger request comprises first request parameters and the fault information. The first request parameters include the first sequence number (Sa)

and the first sequence reset time (Ty) encoded into the second packet header by the processor 108*a* of the line module 70*a*.

In step 712, at a time of ten (10) milliseconds or less, the optical protection switching module 70*b* of the tail-end optical node 14*g* receives the first fault packet and processes the first fault packet to determine if the fault information contained in the first fault packet is new fault information. The optical protection switching module 70*b* determines if the fault information contained in the first fault packet is new fault information by comparing the first sequence number (Sa) and the first sequence reset time (Ty) in the first packet header to a stored sequence number (Sz) and a stored sequence reset time (Tx) stored in the non-transitory processor-readable medium 110*b* of the optical protection switching module 70*b*. In the illustrated embodiment, the optical protection switching module 70*b* determined that the first sequence number (Sa) in the first packet header was less than (or smaller than) the stored sequence number (Sz) and the first sequence reset time (Ty) in the first packet header was not equal to the stored sequence reset time (Tx) so the optical protection switching module 70*b* determined that the sequence number had been reset (or rolled over) and the processor 108*b* is programmed to replace the stored sequence number with the first sequence number and the stored sequence reset time with the first sequence reset time and perform a protection switch based on the fault information in the first fault packet.

In step 714, at a time of fifty (50) milliseconds, the optical protection switching module 70*b* of the tail-end optical node 14*g* receives the first fault trigger request and processes the first fault trigger request to determine if the fault information contained in the first fault trigger request is new fault information. The optical protection switching module 70*b* determines if the fault information contained in the first fault trigger request is new fault information by comparing the first sequence number (Sa) and the first sequence reset time (Ty) in the first request parameters to the stored sequence number (now equal to the first sequence number (Sa)) and the stored sequence reset time (now equal to the first sequence reset time (Ty)) stored in the non-transitory processor-readable medium 110*b* of the optical protection switching module 70*b*. In the illustrated embodiment, at step 714 the optical protection switching module 70*b* determined that the first sequence number (Sa) in the first request parameters was equal to the stored sequence number (now equal to Sa) and the first sequence reset time (Ty) in the first request parameters was equal to the stored sequence reset time (now equal to Ty) so the processor 108*b* caused the optical protection switching module 70*b* to discard the first fault trigger request. In other words, the optical protection switching module 70*b* determined that the fault information in the first fault trigger request was stale and should not be processed or acted upon to avoid unwanted protection switching.

NON-LIMITING ILLUSTRATIVE EMBODIMENTS OF THE INVENTIVE CONCEPT(S)

Illustrative embodiment 1. A head-end node, comprising: a node controller comprising a first processor, a first non-transitory processor-readable medium storing first processor-executable instructions, a first network switch configured to communicate using a first network path and a second network path, and packet forwarding circuitry forming a portion of the first network path; and a digital line module comprising a second processor, a second non-transitory processor-readable medium storing second processor-executable instructions, and a second network switch configured to communicate using the first communication network and the second communication network; wherein the second processor-executable instructions, when executed by the second processor, cause the second processor to: receive fault information related to a fault; generate a fault packet comprising a packet header and the fault information, the packet header including a first sequence number and a first sequence reset time; generate a fault trigger request comprising request parameters and the fault information, the request parameters including the first sequence number and the first sequence reset time; and send the fault packet and the fault trigger request to the node controller, the fault packet sent via the first network path and the fault trigger request sent via the second network path; and wherein the packet forwarding circuitry of the node controller is configured to: receive the fault packet and automatically forward the fault packet to a third network switch of a second node controller of a tail-end optical node; and wherein the first processor-executable instructions, when executed, cause the first processor of the node controller to receive the fault trigger request, process the fault trigger request, and send the fault trigger request to a third processor of the tail end optical node.

Illustrative embodiment 2. The head-end node of illustrative embodiment 1, wherein the first network path is a first virtual local area network, and the second network path is a second virtual local area network.

Illustrative embodiment 3. The head-end node of illustrative embodiment 1, wherein the packet forwarding circuitry is a field programmable gate array configured to automatically forward the fault packet.

Illustrative embodiment 4. The head-end node of illustrative embodiment 1, wherein the packet header further comprises first packet forwarding information identifying the node controller as a first destination; and wherein automatically forwarding the fault packet to the third network switch of the second node controller of the tail-end optical node comprises: retrieving second packet forwarding information from a table using at least a portion of the first packet forwarding information as a key, the second packet forwarding information identifying the tail-end optical node as a second destination; updating the packet header of the fault packet with the second packet forwarding information; and sending the fault packet toward the tail-end optical node identified by the second packet forwarding information.

Illustrative embodiment 5. The head-end node of illustrative embodiment 1, wherein the second processor-executable instructions further comprise a digital trigger application that, when executed by the second processor, causes the second processor to generate the fault trigger request comprising the request parameters and the fault information; and send the first fault trigger request via the second network path to the node controller.

Illustrative embodiment 6. The head-end node of illustrative embodiment 5, wherein the digital trigger application causes the second processor to generate request parameters further including a nodeID identifying the tail end optical node as a destination for the fault trigger request.

Illustrative embodiment 7. A tail-end optical node, comprising: an optical protection switching module comprising a first processor, a first non-transitory processor-readable medium storing first processor-executable instructions, a stored sequence number, and a stored sequence reset time, a first line port connected to a working path, a second line port connected to a protection path, a system port, and an optical switch coupled to the first line port to receive first optical signals from the working path and the second line port to receive second optical signals from the protection path for selectively switching optical signals from the first line port or the second line port to the system port; and a node controller comprising a second processor, a second non-transitory processor-readable medium storing second processor-executable instructions, and packet forwarding circuitry, wherein the packet forwarding circuitry is configured to receive fault packets via a first network path and the second processor is configured to receive fault packets via a second network path; wherein the packet forwarding circuitry receives a first fault packet comprising a first packet header and fault information related to a fault, the first packet header including a first sequence number and a first sequence reset time and automatically sends the first fault packet to the optical protection switching module; and wherein the second processor receives a first fault trigger request comprising first request parameters and the fault information related to the fault, the first request parameters including the first sequence number and the first sequence reset time, and the second processor-executable instructions cause the second processor to process the first fault trigger request and send the processed first fault trigger request to the optical protection switching module; and wherein the first processor-executable instructions, when executed by the first processor, cause the first processor to: receive, at a first instant in time, the first fault packet and process the first fault packet by comparing the first sequence number and the first sequence reset time to the stored sequence number and the stored sequence reset time stored in the first non-transitory processor-readable medium and, if the first sequence number is greater than the stored sequence number and the first sequence reset time is equal to the stored sequence reset time, replace the stored sequence number with the first sequence number and the stored sequence reset time with the first sequence reset time in the first non-transitory processor-readable medium and switch the first line port or the second line port to the system port on the optical switch based on the fault information; and receive, at a second instant in time later than the first instant in time, the processed first fault trigger request and process the first fault trigger request by comparing the first sequence number and the first sequence reset time to the stored sequence number and the stored sequence reset time stored in the first non-transitory processor-readable medium and, if the first sequence number is equal to or less than the stored sequence number and the first sequence reset time is equal to or less than the stored sequence reset time number, discard the fault information of the first fault trigger request.

Illustrative embodiment 8. The tail-end optical node of illustrative embodiment 7, wherein the packet forwarding circuitry receives a second fault packet comprising a second packet header and second fault information related to a second fault, the second packet header including a second sequence number and a second sequence reset time and automatically sends the second fault packet to the optical protection switching module; and wherein the second processor receives a second fault trigger request comprising second request parameters and the second fault information related to the second fault, the second request parameters including the second sequence number and the second sequence reset time, and the second processor-executable instructions cause the second processor to process the second fault trigger request and send the processed second fault trigger request to the optical protection switching module;

and wherein the first processor-executable instructions, when executed by the first processor, cause the first processor to: receive, at a third instant in time later than the second instant in time, the second fault packet and process the second fault packet by comparing the second sequence number and the second sequence reset time to the stored sequence number and the stored sequence reset time stored in the first non-transitory processor-readable medium and, if the second sequence number is greater than the stored sequence number and the second sequence reset time is equal to the stored sequence reset time, replace the stored sequence number with the second sequence number and replace the stored sequence rest time with the second sequence reset time in the first non-transitory processor-readable medium and switch the first line port or the second line port to the system port on the optical switch based on the fault information; and receive, at a fourth instant in time later than the third instant in time, the second fault trigger request and process the second fault trigger request by comparing the second sequence number and the second sequence reset time to the stored sequence number and the stored sequence reset time stored in the first non-transitory processor-readable medium and, if the second sequence number is equal to or less than the stored sequence number and the second sequence reset time is equal to or less than the stored sequence reset time number, discard the second fault information of the second fault trigger request.

Illustrative embodiment 9. The tail-end optical node of illustrative embodiment 7, wherein the packet forwarding circuitry is a field programmable gate array configured to automatically forward the first fault packet.

Illustrative embodiment 10. The tail-end optical node of illustrative embodiment 7, wherein the first packet header further comprises first packet forwarding information identifying the optical protection switching module as a destination, and wherein the packet forwarding circuitry uses the first packet forwarding information to automatically forward the first fault packet to the optical protection switching module.

Illustrative embodiment 11. The tail-end optical node of illustrative embodiment 7, wherein the first request parameters further include a nodeID identifying the optical protection switching module as a destination for the first fault trigger request.

Illustrative embodiment 12. The tail-end optical node of illustrative embodiment 11, wherein the second processor-executable instructions further comprise a digital trigger application that, when executed by the second processor, causes the second processor to receive and process the first fault trigger request, wherein processing the first fault trigger request includes forwarding, based on the nodeID, the first fault trigger request to the optical protection switching module.

Illustrative embodiment 13. The tail-end optical node of illustrative embodiment 7, wherein the packet forwarding circuitry receives a second fault packet comprising a second packet header and second fault information related to a second fault, the second packet header including a second sequence number and a second sequence reset time and automatically sends the second fault packet to the optical protection switching module; and wherein the second processor receives a second fault trigger request comprising second request parameters and the second fault information related to the second fault, the second request parameters including the second sequence number and the second sequence reset time, and the second processor-executable instructions cause the second processor to process the second fault trigger request and send the processed second fault trigger request to the optical protection switching module; and wherein the first processor-executable instructions, when executed by the first processor, cause the first processor to: receive, at a third instant in time later than the second instant in time, the second fault packet and process the second fault packet by comparing the second sequence number and the second sequence reset time to the stored sequence number and the stored sequence reset time stored in the first non-transitory processor-readable medium and, if the second sequence number is less than the stored sequence number and the second sequence reset time is greater than the stored sequence reset time, replace the stored sequence number with the second sequence number and replace the stored sequence rest time with the second sequence reset time in the first non-transitory processor-readable medium and switch the first line port or the second line port to the system port on the optical switch based on the fault information; and receive, at a fourth instant in time later than the third instant in time, the second fault trigger request and process the second fault trigger request by comparing the second sequence number and the second sequence reset time to the stored sequence number and the stored sequence reset time stored in the first non-transitory processor-readable medium and, if the second sequence number is equal to or less than the stored sequence number and the second sequence reset time is equal to or less than the stored sequence reset time number, discard the second fault information of the second fault trigger request.

Illustrative embodiment 14. A hybrid node, comprising: a node controller comprising a first processor, a first non-transitory processor-readable medium storing first processor-executable instructions, a first network switch configured to communicate using a first network path and a second network path, and packet forwarding circuitry forming a portion of the first network path; and; an optical protection switching module comprising a second processor, a second non-transitory processor-readable medium storing second processor-executable instructions, a stored sequence number, and a stored sequence reset time, a first line port connected to a working path, a second line port connected to a protection path, a system port, and an optical switch coupled to the first line port to receive first optical signals from the working path and the second line port to receive second optical signals from the protection path for selectively switching optical signals from the first line port or the second line port to the system port; and a digital line module comprising a third processor, a third non-transitory processor-readable medium storing third processor-executable instructions, and a second network switch configured to communicate using the first network path and the second network path; wherein the third processor-executable instruction, when executed by the third processor, cause the third processor to: receive a fault signal including fault information related to a fault; generate a first fault packet comprising a first packet header and the fault information, the first packet header including a first sequence number and a first sequence reset time; generate a first fault trigger request comprising first request parameters and the fault information, the first request parameters including the first sequence number and the first sequence reset time; and send the first fault packet and the first fault trigger request to the node controller, the first fault packet sent via the first network path and the first fault trigger request sent via the second network path; and wherein the packet forwarding circuitry of the node controller is configured to: receive the first fault packet and automatically forward the first fault packet to the optical protection switching module; and wherein the first processor-executable instructions, when executed, cause the first processor of the node controller to receive the first fault trigger request, process the first fault trigger request, and send the first fault trigger request to the optical protection switching module; wherein the second processor-executable instructions, when executed by the second processor, cause the second processor to: receive, at a first instant in time, the first fault packet and process the first fault packet by comparing the first sequence number and the first sequence reset time to the stored sequence number and the stored sequence reset time stored in the second non-transitory processor-readable medium and, if the first sequence number is greater than the stored sequence number and the first sequence reset time is equal to the stored sequence reset time, replace the stored sequence number with the first sequence number and the stored sequence rest time with the first sequence reset time in the second non-transitory processor-readable medium and switch the first line port or the second line port to the system port on the optical switch based on the fault information; and receive, at a second instant in time later than the first instant in time, the processed first fault trigger request and further process the processed first fault trigger request by comparing the first sequence number and the first sequence reset time to the stored sequence number and the stored sequence reset time stored in the second non-transitory processor-readable medium and, if the first sequence number is equal to the stored sequence number and the first sequence reset time is equal to the stored sequence reset time number, discard the fault information of the first fault trigger request.

Illustrative embodiment 15. The hybrid node of illustrative embodiment 14, wherein the first network path is a first virtual local area network, and the second network path is a second virtual local area network.

Illustrative embodiment 16. The hybrid node of illustrative embodiment 14, wherein the packet forwarding circuitry is a field programmable gate array configured to receive and automatically forward the first fault packet.

Illustrative embodiment 17. The hybrid node of illustrative embodiment 14, wherein the first packet header further comprises first packet forwarding information identifying the optical protection switching module as a destination, and wherein the packet forwarding circuitry uses the first packet forwarding information to automatically forward the first fault packet to the optical protection switching module.

Illustrative embodiment 18. The hybrid node of illustrative embodiment 14, wherein the third processor-executable instructions further comprise a first digital trigger application that, when executed by the third processor, causes the third processor to generate the first fault trigger request comprising the request parameters and the fault information; and send the first fault trigger request via the second network path to the node controller.

Illustrative embodiment 19. The hybrid node of illustrative embodiment 18, wherein the first digital trigger application causes the third processor to generate request parameters further including a nodeID identifying the optical protection switching module as a destination for the fault trigger request.

Illustrative embodiment 20. The hybrid node of illustrative embodiment 19, wherein the second processor-executable instructions further comprise a second digital trigger application that, when executed by the second processor, causes the second processor to receive and process the first fault trigger request, wherein processing the first fault trigger request includes forwarding, based on the nodeID, the first fault trigger request to the optical protection switching module.

Illustrative embodiment 21. An optical network, comprising: a head-end node, comprising: a first node controller comprising a first processor, a first non-transitory processor-readable medium storing first processor-executable instructions, a first network switch configured to communicate using a first network path and a second network path, and first packet forwarding circuitry forming a portion of the first network path; and a line module comprising a second processor, a second non-transitory processor-readable medium storing second processor-executable instructions, and a second network switch configured to communicate using the first communication network and the second communication network; wherein the second processor-executable instructions, when executed by the second processor, cause the second processor to: receive fault information related to a fault; generate a fault packet comprising a packet header and the fault information, the packet header including a first sequence number and a first sequence reset time; generate a fault trigger request comprising request parameters and the fault information, the request parameters including the first sequence number and the first sequence reset time; and send the fault packet and the fault trigger request to the node controller, the fault packet sent via the first network path and the fault trigger request sent via the second network path; and wherein the packet forwarding circuitry of the node controller is configured to: receive the fault packet and automatically forward the fault packet to a third network switch of a second node controller of the tail-end node; and wherein the first processor-executable instructions, when executed, cause the first processor of the first node controller to receive the fault trigger request, process the fault trigger request, and send the fault trigger request to a fourth processor of the tail end optical node; and wherein the tail-end node comprises: an optical protection switching module comprising a third processor, a third non-transitory processor-readable medium storing third processor-executable instructions, a stored sequence number, and a stored sequence reset time, a first line port connected to a working path, a second line port connected to a protection path, a system port, and an optical switch coupled to the first line port to receive first optical signals from the working path and the second line port to receive second optical signals from the protection path for selectively switching optical signals from the first line port or the second line port to the system port; and the second node controller comprising the fourth processor, a fourth non-transitory processor-readable medium storing fourth processor-executable instructions, and second packet forwarding circuitry, wherein the second packet forwarding circuitry is configured to receive fault packets via the first network path and the fourth processor is configured to receive the fault trigger requests via the second network path; wherein the second packet forwarding circuitry receives the first fault packet comprising the first packet header and fault information related to the fault, the first packet header including the first sequence number and the first sequence reset time and automatically sends the first fault packet to the optical protection switching module; and wherein the second processor receives the first fault trigger request comprising first request parameters and the fault information related to the fault, the first request parameters including the first sequence number and the first sequence reset time, and the second processor-executable instructions cause the fourth processor to process the first fault trigger request and send the processed first fault trigger request to the optical protection switching module; and wherein the third processor-executable instructions, when executed by the third processor, cause the third processor to: receive, at a first instant in time, the first fault packet and process the first fault packet by comparing the first sequence number and the first sequence reset time to the stored sequence number and the stored sequence reset time stored in the third non-transitory processor-readable medium and, if the first sequence number is greater than the stored sequence number and the first sequence reset time is equal to the stored sequence reset time, replace the stored sequence number with the first sequence number and the stored sequence reset time with the first sequence reset time in the third non-transitory processor-readable medium and switch the first line port or the second line port to the system port on the optical switch based on the fault information; and receive, at a second instant in time later than the first instant in time, the processed first fault trigger request and process the first fault trigger request by comparing the first sequence number and the first sequence reset time to the stored sequence number and the stored sequence reset time stored in the third non-transitory processor-readable medium and, if the first sequence number is equal to or less than the stored sequence number and the first sequence reset time is equal to or less than the stored sequence reset time number, discard the fault information of the first fault trigger request.

CONCLUSION

Conventionally, software-based forwarding has been used in networks requiring inter-domain packet forwarding. While software-based forwarding has proven reliable, lowering the fault relay time has been difficult, especially when a fault source and destination are hosted on different nodes and/or are situated on different network layers (e.g., a fault source in a digital layer (Layer-1) and a destination in an optical layer (Layer-0)).

The systems and methods described herein solve these and other problems by providing fault propagation via both a fast path (e.g., hardware-assisted digital fault relay) that significantly reduces fault relay time and a slow path (e.g., software-based digital fault relay) that ensures reliability. By sending fault information in a fault packet transmitted on the fast path and a fault trigger request transmitted on the slow path, each of the fault packet and fault trigger request having the same sequence number and sequence reset time encoded therein, the systems and methods described herein can bring a protection switching time to less than fifty (50) milliseconds using the fast path while still ensuring reliability with the slow path acting as a back-up to ensure that protection switching always takes place.

The inventive fault-tolerant protection switching systems and methods described herein, include a line module (fault source) that sends fault information in the form of fault pairs with a fault packet sent via a first network path (hardware-assisted "fast path") and a fault rigger request sent via a second network path (software-based "slow path") to an optical protection switching module (destination). Each of the fault packet and the fault trigger request may be provided with a packet header and request parameters, respectively, that include the fault information as well as a sequence number and a sequence reset time. In a fault pair, the fault information, sequence number, and sequence reset time will all be the same. The optical protection switching module is configured to process the fault packet and the fault trigger request as they are received and execute protection switching based on the fault information contained therein. To ensure that the protection switching is only performed once, the optical protection switching module compares the sequence number and the sequence reset time in the packet header of a received fault packet and the request parameters of the fault trigger request to a stored sequence number and a stored sequence reset time. If the sequence number in the packet header or request parameters is greater than the stored sequence number and the sequence reset time in the packet header or request parameters is equal to the stored sequence reset time, the fault information is considered new and protection switching is executed. On the other hand, if the sequence number in the packet header or request parameters is the same as the stored sequence number and the sequence reset time in the packet header or request parameters is the same as the stored sequence reset time, the fault information is considered stale and the fault packet or fault trigger request is discarded.

The foregoing description provides illustration and description, but is not intended to be exhaustive or to limit the inventive concepts to the precise form disclosed. Modifications and variations are possible in light of the above teachings or may be acquired from practice of the methodologies set forth in the present disclosure.

Even though particular combinations of features are recited in the claims and/or disclosed in the specification, these combinations are not intended to limit the disclosure. In fact, many of these features may be combined in ways not specifically recited in the claims and/or disclosed in the specification. Although each dependent claim listed below may directly depend on only one other claim, the disclosure includes each dependent claim in combination with every other claim in the claim set.

No element, act, or instruction used in the present application should be construed as critical or essential to the invention unless explicitly described as such outside of the preferred embodiment. Further, the phrase "based on" is intended to mean "based, at least in part, on" unless explicitly stated otherwise.

What is claimed is:

1. A hybrid node, comprising:
a node controller comprising a first processor, a first non-transitory processor-readable medium storing first processor-executable instructions, a first network switch configured to communicate using a first network path and a second network path, and packet forwarding circuitry forming a portion of the first network path; and;
an optical protection switching module comprising a second processor, a second non-transitory processor-readable medium storing second processor-executable instructions, a stored sequence number, and a stored sequence reset time, a first line port connected to a working path, a second line port connected to a protection path, a system port, and an optical switch coupled to the first line port to receive first optical signals from the working path and the second line port to receive second optical signals from the protection path for selectively switching optical signals from the first line port or the second line port to the system port; and
a digital line module comprising a third processor, a third non-transitory processor-readable medium storing third processor-executable instructions, and a second network switch configured to communicate using the first network path and the second network path;

wherein the third processor-executable instruction, when executed by the third processor, cause the third processor to:
receive a fault signal including fault information related to a fault;
generate a first fault packet comprising a first packet header and the fault information, the first packet header including a first sequence number and a first sequence reset time;
generate a first fault trigger request comprising first request parameters and the fault information, the first request parameters including the first sequence number and the first sequence reset time; and
send the first fault packet and the first fault trigger request to the node controller, the first fault packet sent via the first network path and the first fault trigger request sent via the second network path; and
wherein the packet forwarding circuitry of the node controller is configured to:
receive the first fault packet and automatically forward the first fault packet to the optical protection switching module; and
wherein the first processor-executable instructions, when executed, cause the first processor of the node controller to receive the first fault trigger request, process the first fault trigger request, and send the first fault trigger request to the optical protection switching module;
wherein the second processor-executable instructions, when executed by the second processor, cause the second processor to:
receive, at a first instant in time, the first fault packet and process the first fault packet by comparing the first sequence number and the first sequence reset time to the stored sequence number and the stored sequence reset time stored in the second non-transitory processor-readable medium and, if the first sequence number is greater than the stored sequence number and the first sequence reset time is equal to the stored sequence reset time, replace the stored sequence number with the first sequence number and the stored sequence rest time with the first sequence reset time in the second non-transitory processor-readable medium and switch the first line port or the second line port to the system port on the optical switch based on the fault information; and
receive, at a second instant in time later than the first instant in time, the processed first fault trigger request and further process the processed first fault trigger request by comparing the first sequence number and the first sequence reset time to the stored sequence number and the stored sequence reset time stored in the second non-transitory processor-readable medium and, if the first sequence number is equal to the stored sequence number and the first sequence reset time is equal to the stored sequence reset time number, discard the fault information of the first fault trigger request.

2. The hybrid node of claim 1, wherein the first network path is a first virtual local area network, and the second network path is a second virtual local area network.

3. The hybrid node of claim 1, wherein the packet forwarding circuitry is a field programmable gate array configured to receive and automatically forward the first fault packet.

4. The hybrid node of claim 1, wherein the first packet header further comprises first packet forwarding information identifying the optical protection switching module as a destination, and wherein the packet forwarding circuitry uses the first packet forwarding information to automatically forward the first fault packet to the optical protection switching module.

5. The hybrid node of claim 1, wherein the third processor-executable instructions further comprise a first digital trigger application that, when executed by the third processor, causes the third processor to generate the first fault trigger request comprising the request parameters and the fault information; and send the first fault trigger request via the second network path to the node controller.

6. The hybrid node of claim 5, wherein the first digital trigger application causes the third processor to generate request parameters further including a nodeID identifying the optical protection switching module as a destination for the fault trigger request.

7. The hybrid node of claim 6, wherein the second processor-executable instructions further comprise a second digital trigger application that, when executed by the second processor, causes the second processor to receive and process the first fault trigger request, wherein processing the first fault trigger request includes forwarding, based on the nodeID, the first fault trigger request to the optical protection switching module.

* * * * *